(12) United States Patent
Wang et al.

(10) Patent No.: US 12,167,038 B2
(45) Date of Patent: *Dec. 10, 2024

(54) DEBLOCKING FILTER FOR SUB-PARTITION BOUNDARIES CAUSED BY INTRA SUB-PARTITION CODING TOOL

(71) Applicant: HUAWEI TECHNOLOGIES CO., LTD., Guangdong (CN)

(72) Inventors: Biao Wang, Shenzhen (CN); Anand Meher Kotra, Munich (DE); Semih Esenlik, Munich (DE); Han Gao, Shenzhen (CN); Jianle Chen, San Diego, CA (US)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/455,636

(22) Filed: Aug. 25, 2023

(65) Prior Publication Data

US 2023/0412845 A1 Dec. 21, 2023

Related U.S. Application Data

(63) Continuation of application No. 17/399,203, filed on Aug. 11, 2021, now Pat. No. 11,856,228, which is a
(Continued)

(51) Int. Cl.
*H04N 19/80* (2014.01)
*H04N 19/117* (2014.01)
(Continued)

(52) U.S. Cl.
CPC ........... *H04N 19/66* (2014.11); *H04N 19/176* (2014.11); *H04N 19/593* (2014.11); *H04N 19/80* (2014.11)

(58) Field of Classification Search
CPC ........ H04N 19/80; H04N 19/82; H04N 19/86; H04N 19/117
See application file for complete search history.

(56) References Cited

U.S. PATENT DOCUMENTS

| 7,388,996 B2 | 6/2008 | Lainema et al. |
| 7,929,610 B2 | 4/2011 | Sun |

(Continued)

FOREIGN PATENT DOCUMENTS

| JP | 2014526818 A | 10/2014 |
| RU | 2653475 C2 | 5/2018 |
| WO | 2020167228 A1 | 8/2020 |

OTHER PUBLICATIONS

HEVC deblocking filter; Norkin; 2012. (Year: 2012).*
(Continued)

*Primary Examiner* — Luis Perez-Fuentes
(74) *Attorney, Agent, or Firm* — HUAWEI TECHNOLOGIES CO., LTD.

(57) ABSTRACT

A deblocking method is provided for deblocking a sub-partition boundary within a coding block during image encoding and/or image decoding process. The coding block is coded in an intra prediction mode and the coding block is partitioned into sub-partitions comprising a first sub-partition and a second sub-partition that is adjacent to the first sub-partition. The method comprises: determining a maximum filter length to be 1 for a first/second sub-partition when a width of the first or second sub-partition is 4 samples, or when a height of the first or second sub-partition is 4 samples; modifying a value of up to one sample of the first or second sub-partition, wherein the value of the up to one sample is obtained from a row or a column of the first or second sub-partition that is perpendicular to and adjacent to the sub-partitions boundary between the first sub-partition and the second sub-partition.

21 Claims, 21 Drawing Sheets

Related U.S. Application Data continuation of application No. 16/994,277, filed on Aug. 14, 2020, now Pat. No. 11,122,299, which is a continuation of application No. PCT/CN2020/071272, filed on Jan. 10, 2020.

(60) Provisional application No. 62/791,003, filed on Jan. 10, 2019.

(51) Int. Cl.
  H04N 19/176 (2014.01)
  H04N 19/593 (2014.01)
  H04N 19/66 (2014.01)

(56) References Cited

U.S. PATENT DOCUMENTS

| | | | |
|---|---|---|---|
| 9,338,476 B2* | 5/2016 | Van der Auwera | H04N 19/159 |
| 9,602,834 B2* | 3/2017 | Song | H04N 19/126 |
| 9,686,561 B2 | 6/2017 | Li et al. | |
| 9,712,822 B2* | 7/2017 | Han | H04N 19/139 |
| 9,787,988 B2 | 10/2017 | Song et al. | |
| 10,003,820 B2 | 6/2018 | Lee et al. | |
| 10,027,972 B2* | 7/2018 | Han | H04N 19/52 |
| 10,116,935 B2 | 10/2018 | Sasai et al. | |
| 10,158,880 B2* | 12/2018 | Song | H04N 19/523 |
| 10,205,944 B2* | 2/2019 | Minezawa | H04N 19/80 |
| 10,306,262 B2* | 5/2019 | Han | H04N 19/139 |
| 10,412,419 B2 | 9/2019 | Kim et al. | |
| 10,750,171 B2 | 8/2020 | Chen et al. | |
| 11,122,299 B2* | 9/2021 | Wang | H04N 19/117 |
| 11,490,080 B2* | 11/2022 | Andersson | H04N 19/18 |
| 11,856,228 B2* | 12/2023 | Wang | H04N 19/82 |
| 2001/0019634 A1 | 9/2001 | Lainema et al. | |
| 2006/0126962 A1 | 6/2006 | Sun | |
| 2009/0034855 A1 | 2/2009 | Chuang | |
| 2013/0058401 A1 | 3/2013 | Song et al. | |
| 2013/0188733 A1 | 7/2013 | Van der Auwera et al. | |
| 2014/0185689 A1 | 7/2014 | Narroschke et al. | |
| 2015/0350687 A1 | 12/2015 | Zhai et al. | |
| 2017/0045101 A1 | 2/2017 | Sun et al. | |
| 2017/0302966 A1 | 10/2017 | Xu et al. | |
| 2018/0270480 A1 | 9/2018 | Zhang et al. | |
| 2020/0382775 A1 | 12/2020 | Kotra et al. | |
| 2020/0404333 A1 | 12/2020 | Wang et al. | |

OTHER PUBLICATIONS

Results for intra deblock filter testing by SKKU-JCTVC; Yang—2011. (Year: 2011).*

Intra prediction using In-loop residual coding for post-HEVC standard; Mohsen—2017. (Year: 2017).*

Deblocking for N×N block boundaries not aligned with 8×8 grid; Anderson—Jan. 2019. (Year: 2019).*

Versatile video coding; Draft 3; Bross; et al. Oct. 2018. (Year: 2018).*

Benjamin Bross et al, "Versatile Video Coding (Draft 3)", Joint Video Experts Team (JVET) of ITU-T SG 16 WP 3 and ISO/IEC JTC 1/SC 29/WG 11 , 12th Meeting: Macao, CN, Oct. 3-12, 2018, Document: JVET-L1001-v9, section 8.6.2. total 20 pages.

Document: JVET-M0102-v3, Santiago De-Lux n-Hem ndez et al, CE3: Intra Sub-Partitions Coding Mode (Tests 1.1.1and1.1.2), Joint VIdeo ExpeHs Team (JVET)of ITU-T SG 16 WP 3 and ISO/IEC JTC 1/SC 29/WG11, 13th Meeting: Marakech, MA, Jan. 9-18, 2019, 8 pages.

Andersson K et al: "CE 11-2.1: Deblocking for 4×N, N×4 and S×N and N×8 blockboundaries not aligned with 8×8 grids" JVET-N0098-v1 , 2019, 6 pages.

Andersson K et al: "CE11: Deblocking for 4×N, N×4 blocks and 8×N, N×8 blocks that are not aligned with 8×8 sample grid (test 11.2.1)", JVET-M0299-v1, 2019, 7 pages.

Andrey Norkin et al: "Chapter 7: In-Loop Filters in HEVC" In: "High Efficiency Video Coding (HEVC)",2014, 38 pages.

Santiago De Luxan Hernandez et al: "CE3: Line-based intra coding mode (Tests 2.1.1 and 2.1.2)", JVET-L0076_v2, 2018 , 9 pages.

NPL Google Search; 2021.(Year: 2021).

Benjamin Bross et al, "Versatile Video Coding (Draft 3)", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L1001-v9, total 235 pages.

Adaptive Deblocking Filter; List—2003; (Year: 2003).

A parallel adaptive loop filter; Sharp—2010; (Year: 2010).

Results for intra deblock filter testing by SKKU-JCTI/C; Yang—2011;(Year: 2011).

* cited by examiner

DEBLOCKING FILTER FOR SUB-PARTITION BOUNDARIES CAUSED BY INTRA SUB-PARTITION CODING TOOL

CROSS-REFERENCE TO RELATED APPLICATIONS

This application is a continuation of U.S. patent application Ser. No. 17/399,203, filed on Aug. 11, 2021, which is a continuation of U.S. application Ser. No. 16/994,277, filed on Aug. 14, 2020, now U.S. Pat. No. 11,122,299, which is a continuation of International Application No. PCT/CN2020/071272, filed on Jan. 10, 2020, which claims the priority to U.S. Provisional Patent Application No. 62/791,003, filed on Jan. 10, 2019. All of the afore-mentioned patent applications are hereby incorporated by reference in their entireties.

TECHNICAL FIELD

Embodiments of the present disclosure generally relate to the field of picture processing and more particularly to deblocking filter for sub-partition boundaries caused by an intra sub-partition (ISP) coding (ISP).

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

Particularly, in the context of intra prediction an Intra Sub-Partition (ISP) coding tool was recently introduced in which an image block (such as a transform unit (TU), a prediction unit (PU), a coding unit (CU)) is partitioned into multiple sub-partitions. Intra sub-partition (ISP), however, may cause discontinuities in sample values across the sub-partition boundaries thereby causing undesirable boundary or edge artifacts that are perceptible by a viewer. A goal in block-based image coding is to reduce edge artifacts below a visibility threshold. This is done by performing deblocking filtering. Such a deblocking filtering is on the one hand performed on decoding side in order to remove the visible edge artifacts, but also on encoding side, in order to prevent the edge artifacts from being encoded into the image at all.

Thus, there is a need for an improved in-loop deblocking filter apparatus and method providing efficient removal of blocking artifacts that would be caused by an intra sub-partition coding tool.

SUMMARY

In view of the above-mentioned challenges, embodiments of the present application aim to provide a deblocking filter apparatus, an encoder, a decoder and corresponding methods that may mitigate or even remove blocking artifacts that would be caused by an intra sub-partition coding tool, so as to improve coding efficiency.

Embodiments of the invention are defined by the features of the independent claims, and further advantageous implementations of the embodiments by the features of the dependent claims.

Particular embodiments are outlined in the attached independent claims, with other embodiments in the dependent claims.

The foregoing and other objects are achieved by the subject matter of the independent claims. Further implementation forms are apparent from the dependent claims, the description and the figures.

According to a first aspect of the present disclosure, it is provided a deblocking method, for deblocking sub-partitions boundary within a coding block in an image encoding and/or an image decoding, wherein the current coding block is coded in an intra prediction mode and the current coding block is partitioned into sub-partitions comprising a first sub-partition and a second sub-partition which is adjacent to the first sub-partition (such as the second sub-partition is on the right or bottom block of the first sub-partitions). In an example, the second sub-partition is intra predicted based on the first sub-partition (i.e. the current coding block is coded using an Intra sub-partition, ISP, tool or the sub-partitions boundary is caused by an Intra sub-partition, ISP, tool, particularly the current coding block is partitioned into sub-partitions by the ISP coding tool and the sub-partitions inside are intra predicted one by one, such as from left to right or from top to bottom); wherein the method comprises:
  determining a first maximum filter length to be 1 for the first sub-partition and/or a second maximum filter length to be 1 for the second sub-partition when a width of the first sub-partition is 4 samples or a width of the second sub-partition is 4 samples, or when a height of the first sub-partition is 4 samples or a height of the second sub-partition is 4 samples;
  modifying (i.e. filtering) a value of up to one sample of the first sub-partition, wherein the up to one sample is obtained from a row or column of the first sub-partition that is perpendicular to and adjacent to the sub-partitions boundary between the first sub-partition and the second sub-partition; and/or
  modifying (i.e. filtering) a value of up to one sample of the second sub-partition, wherein the up to one sample is obtained from a row or column of the second sub-partition that is perpendicular to and adjacent to the sub-partitions boundary between the first sub-partition and the second sub-partition.

It can be understood that the first maximum filter length for the first sub-partition, may refer to in each row or column perpendicular to and adjacent to the sub-partitions boundary, a maximum number of samples allowed to be modified for the first sub-partition. The second maximum filter length for the second sub-partition, may refer to in each row or column perpendicular to and adjacent to the sub-partitions boundary, a maximum number of samples allowed to be modified for the second sub-partition. It can be understood that, depending on the particular filtering decision phase, in some cases, no sample may be modified, or in other cases, only one sample may be modified in each row or column perpendicular to and adjacent to the sub-partitions boundary.

Embodiments of the invention apply to both vertical and horizontal sub-partitions boundary. For vertical sub-partitions boundary, the width of the first or second sub-partition is checked whether the width is 4 samples. For horizontal sub-partitions boundary, the height of the first or second sub-partition is checked whether the height is 4 samples.

It is noted that the term "block", "coding block" or "image block" is used in the present disclosure which can be applied for prediction units (PUs), coding units (CUs), etc. In VVC in general transform units and coding units are mostly aligned except in few scenarios when TU tiling or sub block transform (SBT) or ISP is used. It can be understood that the terms "block/image block/coding block" may be exchanged with each other in the present disclosure. The terms "sample/pixel" may be exchanged with each other in the present disclosure.

The intra sub-partition coding tool partitions an intra prediction block (i.e. an intra coding block short for a current coding block which is coded in intra prediction mode) into sub-partitions and predicts the sub-partitions inside one by one. There might be a discontinuity across the sub-partition boundary. An improved filtering process is proposed to reduce the artifact caused by these sub-partition boundaries, in which filtering up to one sample is performed in the first or second sub-partition when a height of the first or second sub-partition is 4 samples or when a width of the first or second sub-partition is 4 samples. This allows for modifying a small number of sample values at the sub-partitions boundary, and therefore the method can reduce the block artifacts that might be caused by sub-partition boundaries in the current coding block due to the application of the ISP. The weak filtering is advantageous in terms of the computational load.

In a possible implementation form of the method according to the first aspect as such, wherein the up to one sample, which is obtained from the column of the first or second sub-partition that is perpendicular to and adjacent to the boundary between the first and second sub-partitions, is modified when a height of the first or second sub-partition is 4 samples if an intra sub-partitions split type of partitioning the current coding block into sub-partitions is horizontal. It can be understood that "the up to one sample is modified" may refer to at most one sample is allowed to be modified. That is, depending on the particular filtering decision phase, in some cases, no sample may be modified, or in other cases, only one sample may be modified in each column perpendicular to and adjacent to the sub-partitions boundary.

In a possible implementation form of the method according to the first aspect as such, wherein the up to one sample, which is obtained from the row of the first or second sub-partition that is perpendicular to and adjacent to the boundary between the first and second sub-partitions, is modified when a width of the first or second sub-partition is 4 samples if an intra sub-partitions split type of partitioning the current coding block into sub-partitions is vertical. It can be understood that "the up to one sample is modified" may refer to at most one sample is allowed to be modified. That is, depend on the particular filtering decision phase, in some cases, no sample may be modified, or in other cases only one sample may be modified in each row perpendicular to and adjacent to the sub-partitions boundary.

In a possible implementation form of the method according to any preceding implementation of the first aspect or the first aspect as such, wherein if the intra sub-partitions split type of partitioning the current coding block into sub-partitions is horizontal, the sub-partitions boundary between the first and second sub-partitions is a horizontal sub-partitions boundary; Alternatively, if the intra sub-partitions split type of partitioning the current coding block into sub-partitions is vertical, the sub-partitions boundary between the first and second sub-partitions is a vertical sub-partitions boundary.

In a possible implementation form of the method according to any preceding implementation of the first aspect or the first aspect as such, wherein if the intra sub-partitions split type of partitioning the current coding block into sub-partitions is vertical, the first sub-partition may be left to the second sub-partition and the second sub-partition may be intra predicted based on a reconstructed value (e.g. a reconstructed version) of the first sub-partition;

if the intra sub-partitions split type of partitioning the current coding block into sub-partitions is horizontal, the first sub-partition may be top of the second sub-partition and the second sub-partition may be intra predicted based on a reconstructed value (e.g. a reconstructed version) of the first sub-partition.

It can be understood that, the second sub-partition is intra predicted based on the reconstructed version (i.e. reconstructed values) of the first sub-partition. The reconstructed first sub-partition represents a reference for intra prediction of the second sub-partition. It is noted that after a current picture to which the current coding block belongs are reconstructed, the reconstructed picture is input to the filtering process. During the reconstruction of the current picture, the current coding block which is applied by the ISP coding tool is intra predicted to obtain the predictive block (e.g. predicted values) of the current coding block, in particular, the sub-partitions inside the current intra coding block are intra predicted one by one.

In a possible implementation form of the method according to any preceding implementation of the first aspect or the first aspect as such, wherein the number of sub-partitions is 2 or 4.

In a possible implementation form of the method according to any preceding implementation of the first aspect or the first aspect as such, wherein if a width of the current coding block is equal to 4 and a height of the coding block is equal to 8 and/or if the width of the current coding block is equal to 8 and the height of the current coding block is equal to 4, the number of sub-partitions is 2, otherwise, the number of sub-partitions is 4.

In a possible implementation form of the method according to any preceding implementation of the first aspect or the first aspect as such, wherein the up to one sample in the first or second sub-partition is modified even if the sub-partitions boundary between the first and second sub-partitions is not overlapped with an n×n sample grid, wherein n is an integer.

It is allowed to de-blocking the target boundaries, which is not aligned with an n×n grid, but is caused by ISP and is an internal boundary between sub-partitions of a coding block.

In a possible implementation form of the method according to any preceding implementation of the first aspect or the first aspect as such, wherein the up to one sample in the first or second sub-partition is modified only if the sub-partitions boundary between the first and second sub-partitions overlaps with an n×n sample grid, wherein n is an integer, for example, n=4 or n=8. Thereby, the computational load may be further reduced.

Moreover, the filtering of up to one sample in the sub-partitions may be performed only when the heights of all of the sub-partitions are 4 samples or when the widths of all of the sub-partitions are 4 samples. Thereby, the computational load of the overall coding process may be further reduced.

In general, the sub-partitions may be rectangular transform block sub-partitions.

In a possible implementation form of the method according to any preceding implementation of the first aspect or the first aspect as such, wherein samples of the sub-partitions are luma samples, or the samples of the sub-partitions are chroma samples.

In a possible implementation form of the method according to any preceding implementation of the first aspect or the first aspect as such, the order of intra predicting the sub-partitions is from left to right if the intra sub-partitions split type of partitioning the current coding block into sub-partitions is vertical or wherein the order of intra predicting the sub-partitions is from top to down if the intra sub-partitions split type of partitioning the current coding block into sub-partitions is horizontal. That is, the partitioning of the prediction block into the sub-partitions may be performed in a vertical direction. In this case, the order of intra predicting the sub-partitions is one by one from left to right. Alternatively, the partitioning of the prediction block into the sub-partitions may be performed in a horizontal direction. In this case, the order of intra predicting the two sub-partitions is one by one from top to down.

In the present disclosure, the current coding block is coded using an intra sub-partition (ISP) tool or the sub-partitions boundary is caused by an intra sub-partition (ISP) tool.

In general, boundary strengths of all boundaries between the sub-partitions of the coding block may be set to a constant value indicating the strength of the filtering process (for example, 2) in order to simplify the overall processing.

Moreover, in the above-described embodiments, the method may comprise obtaining coded block flag, CBF, values corresponding to two adjacent sub-partitions, determining a boundary strength of a boundary between two adjacent sub-partitions of the current block, according to the CBF values corresponding to the two adjacent sub-partitions and performing the filtering decision whether filtering is performed or not according to the determined boundary strength. At least one of the CBF values corresponding to two adjacent sub-partitions may be not equal to 0, where 0 implies that there is no residual data after quantization of that sub-partition.

According to a second aspect of the present disclosure, it is provided a de-blocking method, for deblocking block edges between image blocks in an image encoding and/or an image decoding, wherein the block edges comprises an edge between a current sub-partition of a current coding block (i.e. a current intra coding block) and a neighboring block of the current coding block, wherein the current coding block is coded in intra prediction mode and the current coding block is partitioned into sub-partitions (or the current coding block is coded using an Intra sub-partition, ISP, tool or sub-partitions is caused by an Intra sub-partition, ISP, tool); wherein the method comprises:

determining a third maximum filter length to be 1 for the current sub-partition and/or a fourth maximum filter length to be 1 for the neighboring block when a width of the current sub-partition is 4 samples or a height of the current sub-partition is 4 samples;

modifying a value of up to one sample of the current sub-partition, wherein the up to one sample is obtained from a row or column of the current sub-partition that is perpendicular to and adjacent to the edge between the current sub-partition and the neighboring block; and/or modifying a value of up to one sample of the neighboring block, wherein the up to one sample is obtained from a row or column of the neighboring block that is perpendicular to and adjacent to the edge between the current sub-partition and the neighboring block.

It is noted that if the number of sub-partitions is two, the current sub-partition may be the first sub-partition or the second sub-partition according to the first aspect as such. If the number of sub-partitions is more than two, such as four, the current sub-partition may be the leftmost sub-partition or the rightmost sub-partition inside the current coding block if an intra sub-partitions split type of partitioning the current coding block into sub-partitions is vertical, or the current sub-partition may be the topmost sub-partition or the lowermost sub-partition inside the current coding block if an intra sub-partitions split type of partitioning the current coding block into sub-partitions is horizontal.

In the second aspect of the present disclosure, the current sub-partition is intra predicted based on the neighboring block which is adjacent from top or left. It is noted that the neighboring block might not be a coding block with further partitions, i.e. there probably will no sub-partition of the neighboring block.

It can be understood that the third maximum filter length for the current sub-partition, may refer to in each row or column perpendicular to and adjacent to the edge, a maximum number of samples allowed to be modified for the current sub-partition. The fourth maximum filter length for the neighboring block, may refer to in each row or column perpendicular to and adjacent to the edge, a maximum number of samples allowed to be modified for the neighboring block. It can be understood that, depend on the particular filtering decision phase, in some cases, no sample may be modified, or in other cases, only one sample may be modified in each row or column perpendicular to and adjacent to the sub-partitions boundary.

Embodiments of the invention apply to both vertical and horizontal edge between the current sub-partition and the neighboring block. For vertical edge, the width of the current sub-partition or the neighboring block is checked whether the width is 4 samples. For a horizontal edge, the height of the current sub-partition or neighboring block is checked whether the height is 4 samples.

The difference between block edge and sub-partitions boundary is described in the further description. A sub-partitions boundary is an edge which is internal to a coding block which uses Intra sub-partition (ISP) coding tools, and a block edge (i.e. a coding unit (CU) edge or a coding block edge or CU boundary) is an edge shared between two coding units or two coding blocks.

The intra sub-partition coding tool partitions an intra prediction block (i.e. an intra coding block, short for a current coding block which is coded in intra prediction mode) into sub-partitions and predicts the sub-partitions inside the intra prediction block one by one. There might be a discontinuity across the edge between the current sub-partition of the current coding block and a neighboring block of the current coding block. Therefore, an improved filtering process is proposed to reduce the artifact caused by such an edge, in which filtering up to one sample in a current sub-partition or the neighboring block when a height of the current sub-partition is 4 samples or a width of the current sub-partition is 4 samples. This allows for modifying a small number of sample values at the edge, and therefore the method can reduce the block artifacts that might be caused by the edge between the current block to which the ISP is applied and the neighboring block while avoiding filtering overlaps between the edge and a sub-partitions boundary to a certain extent.

In a possible implementation form of the method according to the second aspect as such,
wherein the up to one sample, which is obtained from the column of the current sub-partition that is perpendicular to and adjacent to the edge between the current sub-partition and the neighboring block that is below or top of the current sub-partition, is modified when a height of the current sub-partition is 4 samples if an intra sub-partitions split type of partitioning the current coding block into sub-partitions is horizontal. It can be understood that, "the up to one sample is modified" may refer to at most one sample is allowed to be modified. That is, depending on the particular filtering decision phase, in some cases no sample may be modified, or in other cases only one sample may be modified in each column perpendicular to and adjacent to the edge.

In a possible implementation form of the method according to the second aspect as such,
wherein the up to one sample, which is obtained from the row of the current sub-partition that is perpendicular to and adjacent to the edge between the current sub-partition and the neighboring block that is left or right to the current sub-partition, is modified when a width of the current sub-partition is 4 samples if an intra sub-partitions split type of partitioning the current coding block into sub-partitions is vertical. It can be understood that, "the up to one sample is modified" may refer to at most one sample is allowed to be modified. That is, depending on the particular filtering decision phase, in some cases no sample may be modified, or in other cases only one sample may be modified in each row perpendicular to and adjacent to the edge.

In a possible implementation form of the method according to any preceding implementation of the second aspect or the second aspect as such, wherein if the intra sub-partitions split type of partitioning the current coding block into sub-partitions is vertical, the current sub-partition is right to the neighboring block and the current sub-partition is intra predicted based on a reconstructed value of the neighboring block;
if the intra sub-partitions split type of partitioning the current coding block into sub-partitions is horizontal, the current sub-partition is bottom of the neighboring block and the current sub-partition is intra predicted based on a reconstructed value of the neighboring block.

The current sub-partition may be intra predicted based on another coding block that is positioned adjacent to the coding block. This other coding block may be top of the coding block or left of the coding block. To be more precise, the current sub-partition may be intra predicted based on the reconstructed version of the neighboring coding block.

In a possible implementation form of the method according to any preceding implementation of the second aspect or the second aspect as such, wherein the number of sub-partitions is 2 or 4.

In a possible implementation form of the method according to any preceding implementation of the second aspect or the second aspect as such, wherein
if a width of the current coding block is equal to 4 and a height of the coding block is equal to 8 and/or if the width of the current coding block is equal to 8 and the height of the current coding block is equal to 4, the number of sub-partitions is 2,
otherwise, the number of sub-partitions is 4.

In a possible implementation form of the method according to any preceding implementation of the second aspect or the second aspect as such, wherein the up to one sample in the current sub-partition or in the neighboring block is modified even if the edge between the current sub-partition and the neighboring block is not overlapped with an n×n sample grid, wherein n is an integer. For example, n=4 or n=8.

In a possible implementation form of the method according to any preceding implementation of the second aspect or the second aspect as such, wherein the up to one sample in the current sub-partition or in the neighboring block only if the edge between the current sub-partition and the neighboring block overlaps with an n×n sample grid, wherein n is an integer. For example, n=4 or n=8.

In a possible implementation form of the method according to any preceding implementation of the second aspect or the second aspect as such, wherein samples of the sub-partitions are luma samples, or the samples of the sub-partitions are chroma samples.

In a possible implementation form of the method according to any preceding implementation of the second aspect or the second aspect as such, wherein the sub-partitions are rectangular transform block sub-partitions.

In a possible implementation form of the method according to any preceding implementation of the second aspect or the second aspect as such, wherein the current coding block is coded using an Intra sub-partition, ISP, tool.

According to a third aspect of the present disclosure, it is provided a device for use in an image encoder and/or an image decoder, for deblocking sub-partitions boundary within a coding block, wherein the current coding block is coded in intra prediction mode and the current coding block is partitioned into sub-partitions comprising a first sub-partition and a second sub-partition which is adjacent to the first sub-partition, wherein the second sub-partition is intra predicted based on the first sub-partition; wherein the device comprises a de-blocking filter configured to:
determine a first maximum filter length to be 1 for the first sub-partition and/or a second maximum filter length to be 1 for the second sub-partition when a width of the first sub-partition is 4 samples or a width of the second sub-partition is 4 samples, or when a height of the first sub-partition is 4 samples or a height of the second sub-partition is 4 samples;
modify a value of up to one sample of the first sub-partition, wherein the up to one sample is obtained from a row or column of the first sub-partition that is perpendicular to and adjacent to the sub-partitions boundary between the first sub-partition and the second sub-partition; and/or
modify a value of up to one sample of the second sub-partition, wherein the up to one sample is obtained from a row or column of the second sub-partition that is perpendicular to and adjacent to the sub-partitions boundary between the first sub-partition and the second sub-partition.

According to a fourth aspect of the present disclosure, it is provided a device for use in an image encoder and/or an image decoder, for deblocking block edges between image blocks, wherein the block edges comprises an edge between a current sub-partition of a current coding block and a neighboring block of the current coding block, wherein the current coding block is coded in intra prediction mode and the current coding block is partitioned into sub-partitions; wherein the device comprises a de-blocking filter configured to:

determine a third maximum filter length to be 1 for the current sub-partition and/or a fourth maximum filter length to be 1 for the neighboring block when a width of the current sub-partition is 4 samples or a height of the current sub-partition is 4 samples;

modify a value of up to one sample of the current sub-partition, wherein the up to one sample is obtained from a row or column of the current sub-partition that is perpendicular to and adjacent to the edge between the current sub-partition and the neighboring block; and/or modify a value of up to one sample of the neighboring block, wherein the up to one sample is obtained from a row or column of the neighboring block that is perpendicular to and adjacent to the edge between the current sub-partition and the neighboring block.

The method according to the first aspect of the invention can be performed by the apparatus according to the third aspect of the invention. Further features and implementation forms of the apparatus according to the third aspect of the invention correspond to the features and implementation forms of the method according to the first aspect of the invention.

The method according to the second aspect of the invention can be performed by the apparatus according to the fourth aspect of the invention. Further features and implementation forms of the apparatus according to the fourth aspect of the invention correspond to the features and implementation forms of the method according to the second aspect of the invention.

According to a fifth aspect the invention relates to an apparatus for decoding a video stream includes a processor and a memory. The memory is storing instructions that cause the processor to perform the method according to the first or second aspect.

According to a sixth aspect the invention relates to an apparatus for encoding a video stream includes a processor and a memory. The memory is storing instructions that cause the processor to perform the method according to the first or second aspect.

According to a seventh aspect, a computer-readable storage medium having stored thereon instructions that when executed cause one or more processors configured to code video data is proposed. The instructions cause the one or more processors to perform a method according to the first or second aspect or any possible embodiment of the first or second aspect.

According to an eighth aspect, the invention relates to a computer program comprising program code for performing the method according to the first or second aspect or any possible embodiment of the first or second aspect when executed on a computer.

According to a ninth aspect, the invention relates to an encoder or a decoder comprising processing circuitry for carrying out the method according to the first or second aspect or any possible embodiment of the first or second aspect.

According to a tenth aspect of the invention, a video encoding apparatus is provided. The video encoding apparatus for encoding a picture of a video stream, wherein the video encoding apparatus comprises:

a reconstruction unit configured to reconstruct the picture, wherein the reconstruction of the picture comprises generating a reconstructed block of a current coding block which belongs to the picture, wherein the current coding block is coded in intra prediction mode and the current coding block is partitioned into sub-partitions comprising a first sub-partition and a second sub-partition, wherein the second sub-partition is intra predicted based on the first sub-partition; and a filtering unit configured to process the reconstructed picture into a filtered reconstructed picture, wherein the filtering unit is configured to filter up to one sample in a current sub-partition of reconstructed sub-partitions of the reconstructed block when a height of the current sub-partition or another sub-partition that is adjacent to the current sub-partition is 4 samples or when a width of the current sub-partition or another sub-partition that is adjacent to the current sub-partition is 4 samples, wherein the up to one sample is positioned in a row or column of the current sub-partition perpendicular to a boundary between the current sub-partition and said another sub-partition that is positioned adjacent to the current sub-partition and the one sample is adjacent to the boundary, or wherein the filtering unit is configured to filter a boundary between a current sub-partition of the reconstructed block and a neighboring block which is adjacent to the current sub-partition, based on a respective maximum filter length for the current sub-partition and a respective maximum filter length for the neighboring block, and the respective maximum filter lengths are both 1 when a height of the current sub-partition is 4 samples or when a width of the current sub-partition is 4 samples.

This allows for efficiently improving the quality of reconstructed pictures in the framework of ISP.

In a possible implementation form of the up to one sample, which is obtained from the column of the first or second sub-partition that is perpendicular to and adjacent to the boundary between the first and second sub-partitions, is modified when a height of the first or second sub-partition is 4 samples if an intra sub-partitions split type of partitioning the current coding block into sub-partitions is horizontal. It can be understood that, "the up to one sample is modified" may refer to at most one sample is allowed to be modified. That is, depending on the particular filtering decision phase, in some cases no sample may be modified, or in other cases only one sample may be modified in each column perpendicular to and adjacent to the sub-partitions boundary.

In a possible implementation form the up to one sample, which is obtained from the row of the first or second sub-partition that is perpendicular to and adjacent to the boundary between the first and second sub-partitions, is modified when a width of the first or second sub-partition is 4 samples if an intra sub-partitions split type of partitioning the current coding block into sub-partitions is vertical. It can be understood that, "the up to one sample is modified" may refer to at most one sample is allowed to be modified. That is, depending on the particular filtering decision phase, in some cases no sample may be modified, or in other cases only one sample may be modified in each row perpendicular to and adjacent to the sub-partitions boundary.

In a possible implementation form, if the intra sub-partitions split type of partitioning the current coding block into sub-partitions is horizontal, the sub-partitions boundary between the first and second sub-partitions is a horizontal sub-partitions boundary; Alternatively, if the intra sub-partitions split type of partitioning the current coding block into sub-partitions is vertical, the sub-partitions boundary between the first and second sub-partitions is a vertical sub-partitions boundary.

In a possible implementation form, if the intra sub-partitions split type of partitioning the current coding block into sub-partitions is vertical, the first sub-partition may be left to the second sub-partition and the second sub-partition may be intra predicted based on a reconstructed value of the first sub-partition; if the intra sub-partitions split type of partitioning the current coding block into sub-partitions is horizontal, the first sub-partition may be top of the second sub-partition and the second sub-partition may be intra predicted based on a reconstructed value of the first sub-partition.

It can be understood that, the second sub-partition is intra predicted based on the reconstructed version (i.e. reconstructed values) of the first sub-partition. The reconstructed first sub-partition represents a reference for intra prediction of the second sub-partition. It is noted that after a current picture to which the current coding block belongs are reconstructed, the reconstructed picture is input to the filtering process. During the reconstruction of the current picture, the current coding block which is applied by the ISP coding tool is intra predicted to obtain the predictive block (e.g. predicted values) of the current coding block, in particular, the sub-partitions inside the current intra coding block are intra predicted one by one.

In a possible implementation form, the number of sub-partitions is 2 or 4.

In a possible implementation form
  if a width of the current coding block is equal to 4 and a height of the coding block is equal to 8 and/or if the width of the current coding block is equal to 8 and the height of the current coding block is equal to 4, the number of sub-partitions is 2,
  otherwise, the number of sub-partitions is 4.

In a possible implementation form, the up to one sample in the first or second sub-partition is modified even if the sub-partitions boundary between the first and second sub-partitions is not overlapped with an n×n sample grid, wherein n is an integer.

It is allowed to de-blocking the target boundaries, which is not aligned with an n×n grid, but is caused by ISP and is an internal boundary between sub-partitions of a coding block.

In a possible implementation form, the up to one sample in the first or second sub-partition is modified only if the sub-partitions boundary between the first and second sub-partitions overlaps with an n×n sample grid, wherein n is an integer, for example, n=4 or n=8. Thereby, the computational load may be even further reduced.

Moreover, the filtering of up to one sample in the sub-partitions may be performed only when the heights of all of the sub-partitions are 4 samples or when the widths of all of the sub-partitions are 4 samples. Thereby, the computational load of the overall coding process may be further reduced.

In general, the sub-partitions may be rectangular transform block sub-partitions.

In a possible implementation form, the samples of the sub-partitions are luma samples, or the samples of the sub-partitions are chroma samples.

In a possible implementation form, the order of intra predicting the sub-partitions is from left to right if the intra sub-partitions split type of partitioning the current coding block into sub-partitions is vertical or wherein the order of intra predicting the sub-partitions is from top to down if the intra sub-partitions split type of partitioning the current coding block into sub-partitions is horizontal. That is, the partitioning of the prediction block into the sub-partitions may be performed in a vertical direction. In this case, the order of intra predicting the sub-partitions is one by one from left to right. Alternatively, the partitioning of the prediction block into the sub-partitions may be performed in a horizontal direction. In this case, the order of intra predicting the two sub-partitions is one by one from top to down.

In the present disclosure, the current coding block is coded using an Intra sub-partition, ISP, tool or the sub-partitions boundary is caused by an Intra sub-partition, ISP, tool.

In general, boundary strengths of all boundaries between the sub-partitions of the coding block may be set to a constant value indicating the strength of the filtering process (for example, 2) in order to simplify the overall processing.

Moreover, coded block flag, CBF, values may be obtained corresponding to two adjacent sub-partitions, determining a boundary strength of a boundary between two adjacent sub-partitions of the current block, according to the CBF values corresponding to the two adjacent sub-partitions and
  the filtering decision whether filtering is performed or not may be performed according to the determined boundary strength. At least one of the CBF values corresponding to two adjacent sub-partitions may be not equal to 0, where 0 implies that there is no residual data after quantization of that sub-partition.

According to an eleventh aspect of the invention, a video decoding apparatus is provided. The video decoding apparatus for decoding a picture of an encoded video stream, wherein the video decoding apparatus comprises:
  a reconstruction unit configured to reconstruct the picture, wherein the reconstruction of the picture comprises generating a reconstructed block of a current coding block which belongs to a current picture, wherein the current coding block is coded in intra prediction mode and the current coding block is partitioned into sub-partitions comprising a first sub-partition and a second sub-partition, wherein the second sub-partition is intra predicted based on the first sub-partition; and
  a filtering unit configured to process the reconstructed picture into a filtered reconstructed picture, wherein the filtering unit is configured to filter up to one sample in a current sub-partition of reconstructed sub-partitions of the reconstructed block when a height of the current sub-partition or another sub-partition that is adjacent to the current sub-partition is 4 samples or when a width of the current sub-partition or another sub-partition that is adjacent to the current sub-partition is 4 samples, wherein the up to one sample is positioned in a row or column of the current sub-partition perpendicular to a boundary between the current sub-partition and said another sub-partition that is positioned adjacent to the current sub-partition and the one sample is adjacent to the boundary, or wherein the filtering unit is configured to filter a boundary between a current sub-partition of the reconstructed block and a neighboring block which is adjacent to the current sub-partition, based on a respective maximum filter length for the current sub-partition and a respective maximum filter length for the neighboring block, and the respective maximum filter lengths are both 1 when a height of the current sub-partition is 4 samples or when a width of the current sub-partition is 4 samples.

This allows efficiently improving the quality of reconstructed pictures in the framework of ISP.

Further, it is provided an encoder, comprising means for encoding a current coding block of a current picture, wherein the means comprises means for generating a reconstructed block of the current coding block and means for filtering a reconstructed picture of the current picture according to any one of the above-described embodiments of the inventive methods.

Further, it is provided a decoder, comprising means for decoding a current coding block of a current picture, wherein the means comprises means for generating a reconstructed block of the current coding block and means for filtering a reconstructed picture of the current picture according to any one of the above-described embodiments of the inventive methods.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which.

Figure 1A:
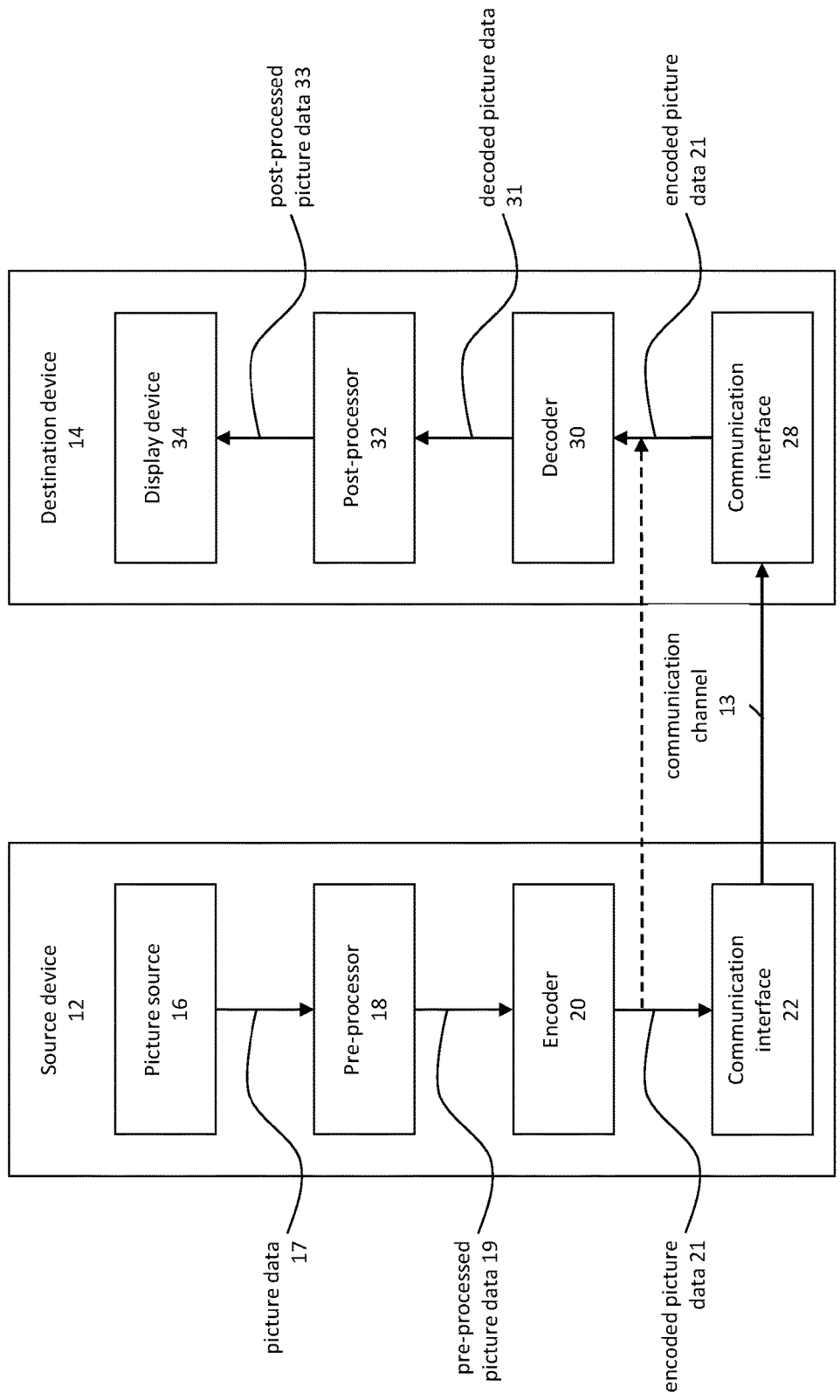
FIG. 1A is a block diagram showing an example of a video coding system configured to implement embodiments of the invention.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
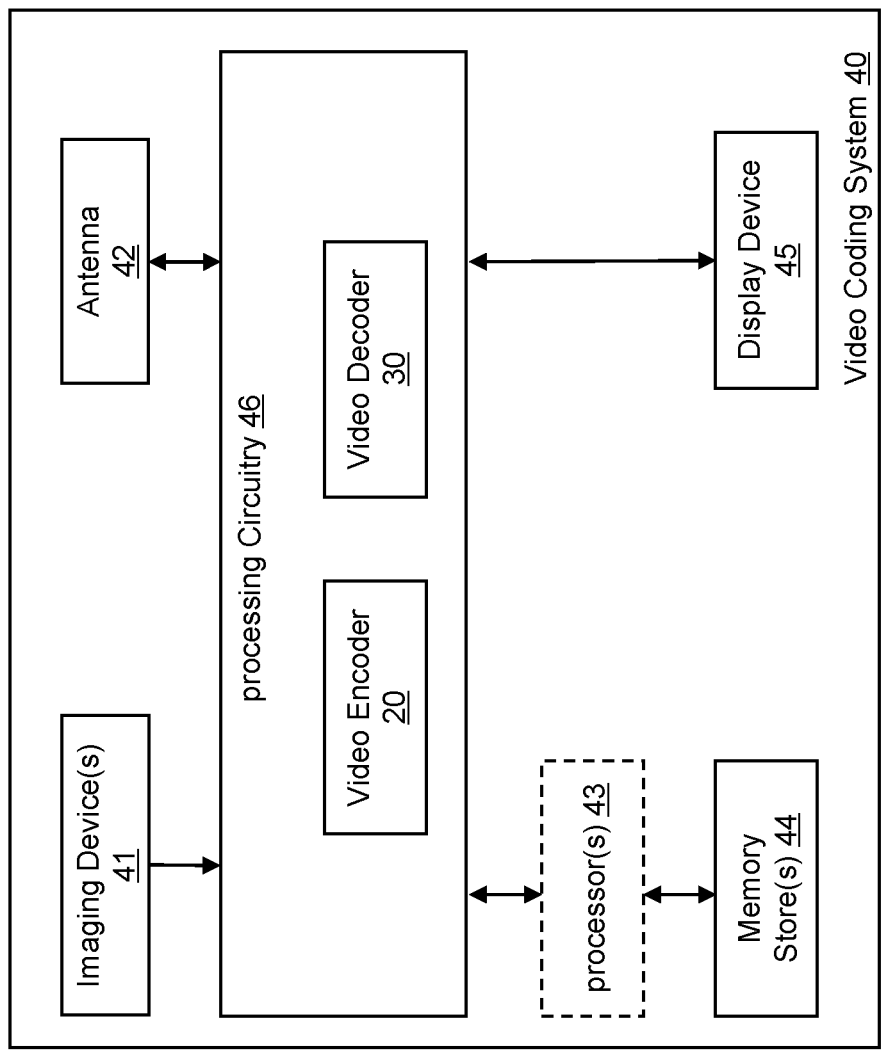
FIG. 1B is a block diagram showing another example of a video coding system configured to implement embodiments of the invention.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the invention are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC.

Encoder and Encoding Method

Figure 2:
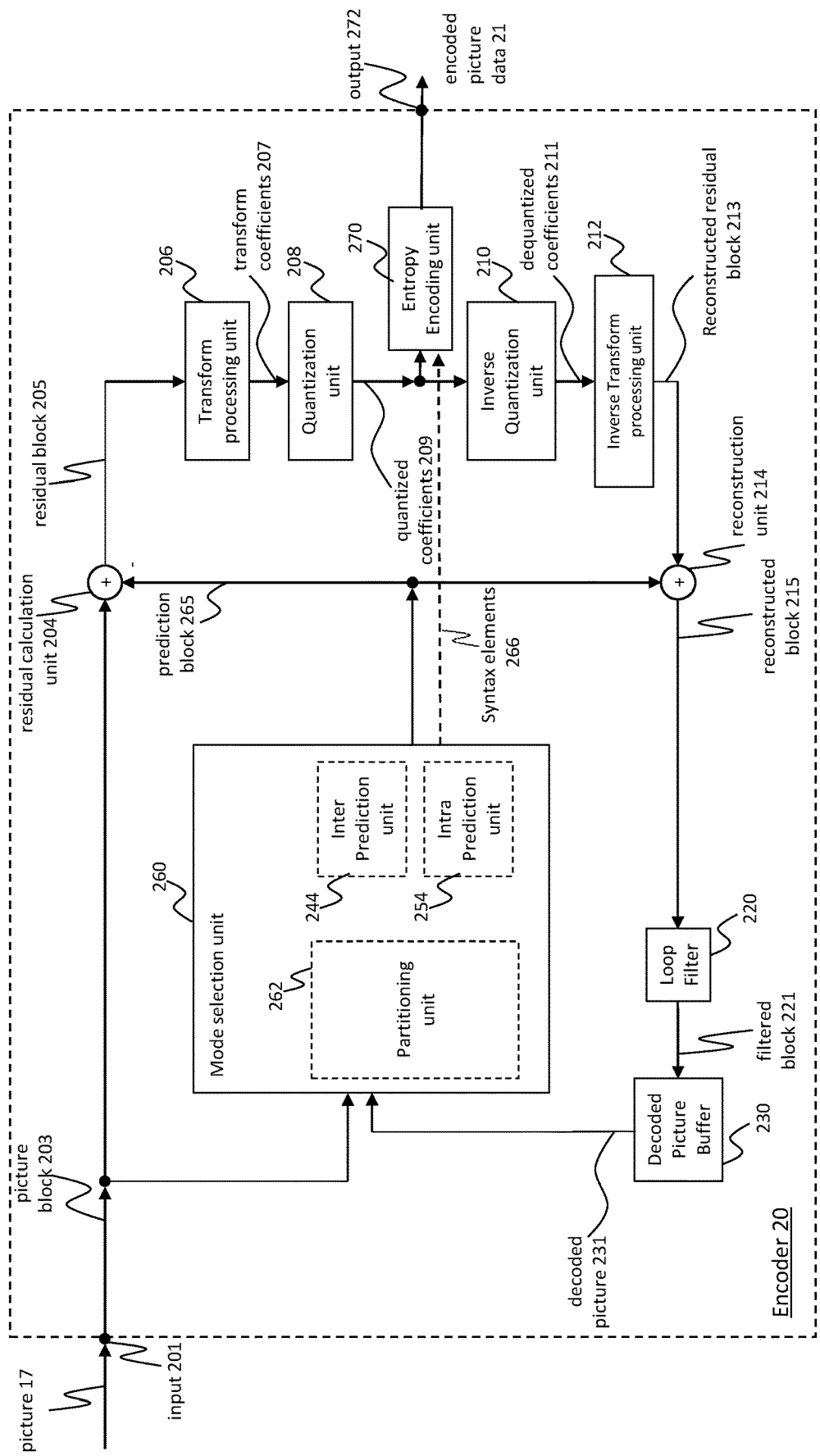
FIG. 2 is a block diagram showing an example of a video encoder configured to implement embodiments of the invention.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
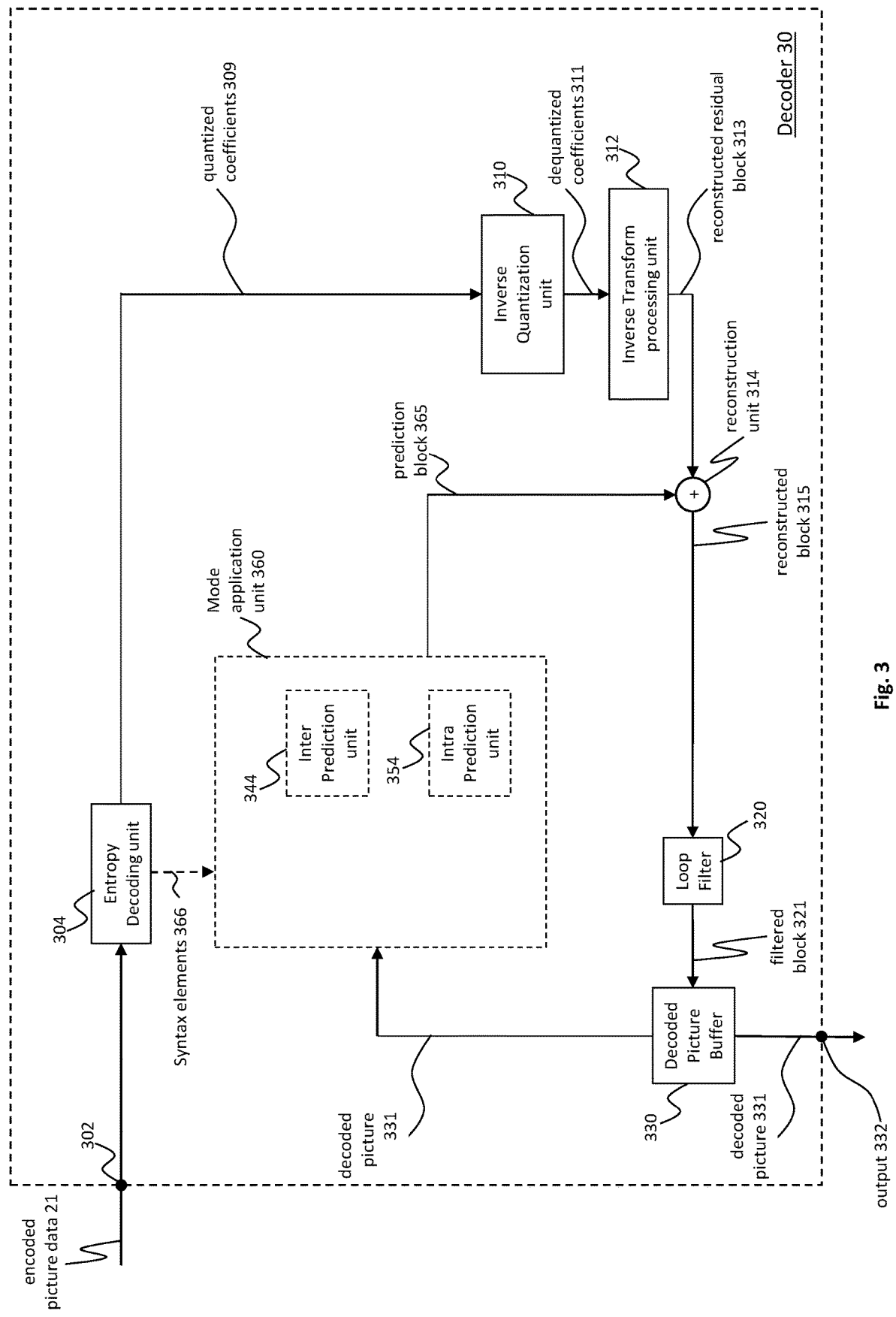
FIG. 3 is a block diagram showing an example structure of a video decoder configured to implement embodiments of the invention.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as (reconstructed) transform block 213.

Reconstruction

The reconstruction unit 214 (e.g. adder or summer 214) is configured to add the (reconstructed) transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular, a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{(bitDepth-1)}-2^{(bitDepth-1)}-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Figure 4:
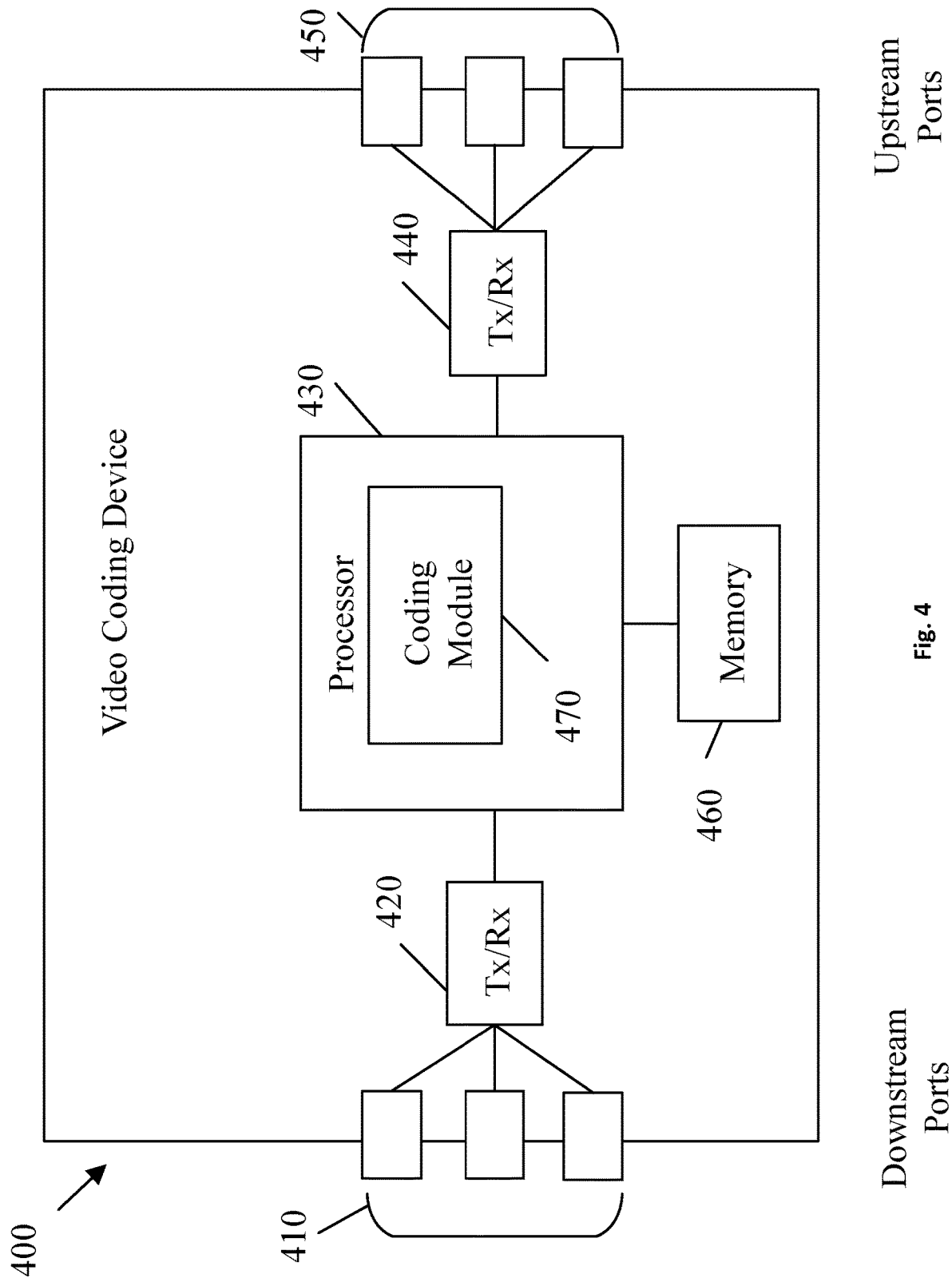
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
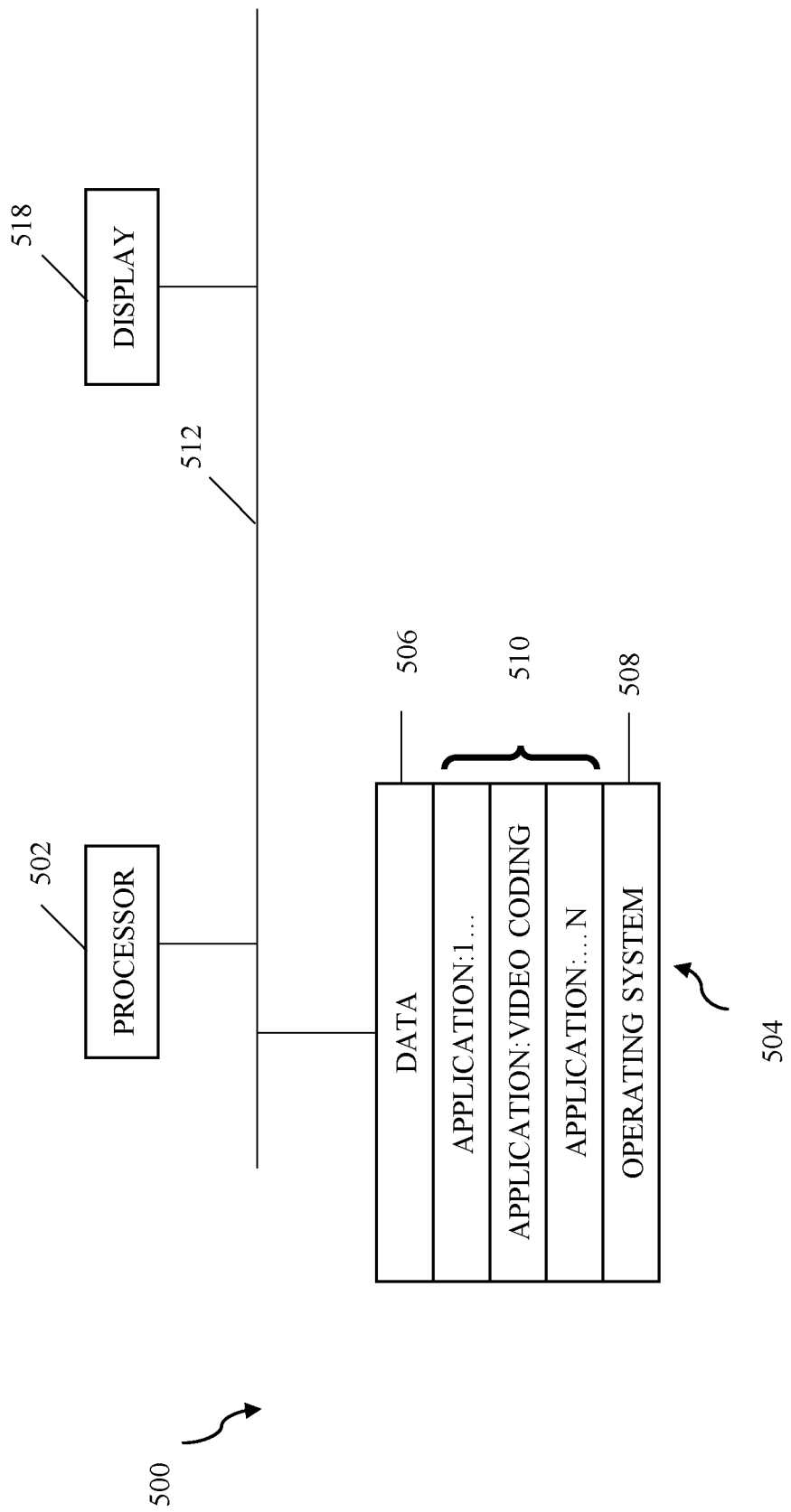
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

The Intra Sub-Partition (ISP) coding tool partitions an intra (prediction) block into multiple sub-partitions, and predicts these sub-partitions, for example, predicts one sub-partition at first and then predicts a following sub-partition. In some situations, there might be discontinuities across the sub-partition boundaries causing block artifacts.

Figure 6:
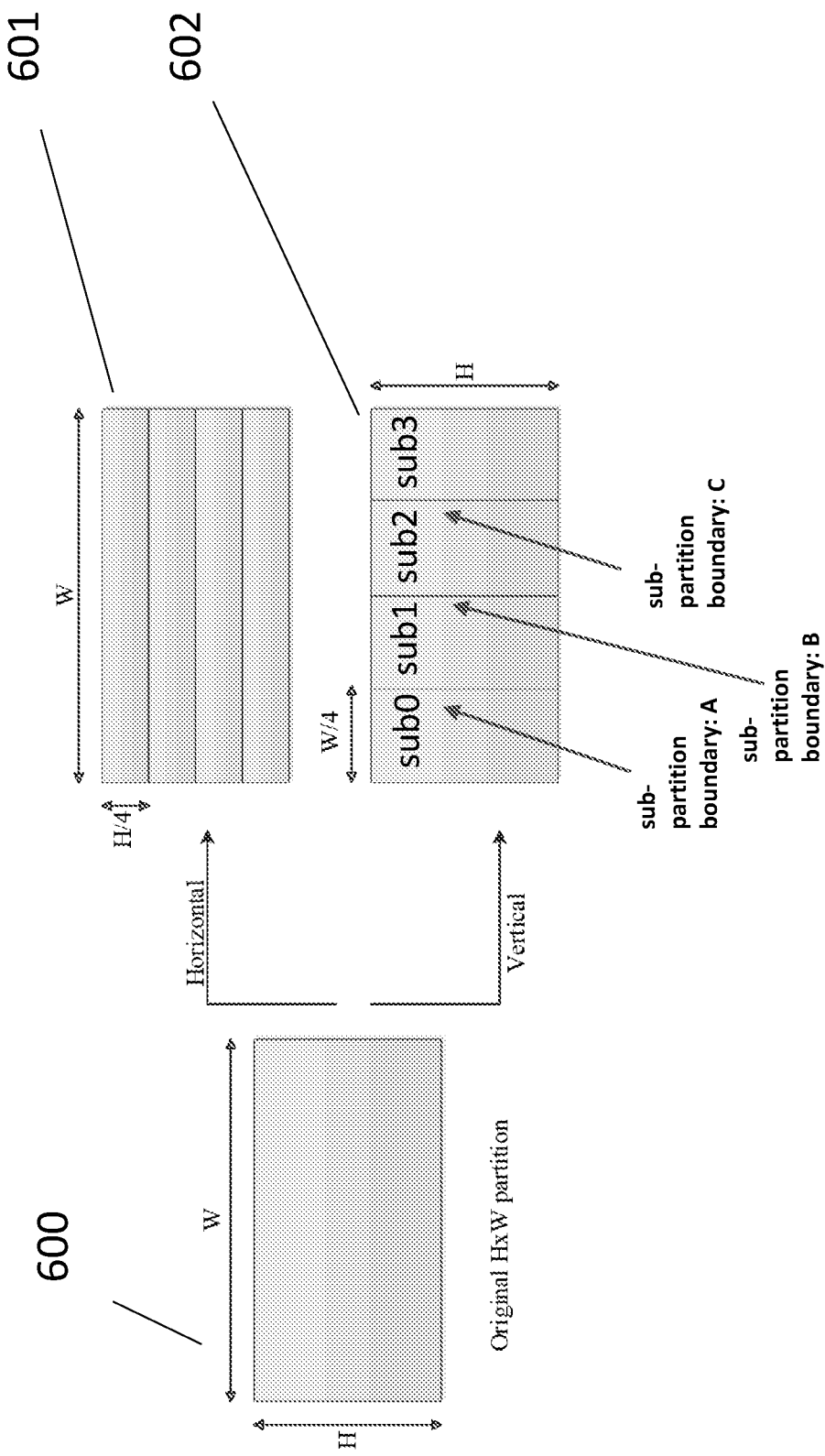
FIG. 6 is a block diagram illustrating an example of deblocking sub-partition edges within a coding unit (CU) which uses an Intra sub-partition (ISP) tool.

In one example, FIG. 6 shows ISP partitioning of an intra block 600 into multiple sub-partitions. In this example, there are two directional partitions, horizontal partition 601 and vertical partition 602; in other examples (not showed in FIG. 6), other partition such as an angular directional partition is performed. In the example shown in FIG. 6, the sub-partitions and the corresponding boundaries with the vertical partition 602 are labeled. Herein, the intra block 600 is divided into four sub-partitions, namely, sub0, sub1, sub2, and sub3. Three sub-partition boundaries are labeled, namely, sub-partition boundary A between sub-partition 0 and 1, sub-partition boundary B between sub-partition 1 and 2, sub-partition boundary C between sub-partition 2 and 3, a similar definition may be used in the example of horizontal partition 601.

In one embodiment, the prediction of sub-partitions is effected by the ISP tool, the sub-partitions may be decoded sequentially. For one sub-partition, a residual signal may be generated by entropy decoding the coefficients sent by the encoder and then inverse quantizing and inverse transforming them. Then, the sub-partition is intra predicted and finally the corresponding reconstructed samples are obtained by adding the residual signal to a prediction signal. The prediction signal may basically represent the intra prediction which is done based on the angular mode from the top and left reference sample lines. Residual is decoded and then added to the prediction signal to form the final prediction These reconstructed samples are then used to predict the next sub-partition. Therefore, the reconstructed values of one sub-partition will be available to generate the prediction of the next one, which will repeat the process and so on. All sub-partitions (sub0, sub1, sub2, sub3) share the same intra mode.

Generally, two processing orders may be used for sub-partitions, normal order and reverse order. In an example, for horizontal partition, normal order is from top to bottom, reverse order is from bottom to top. In another example, for vertical partitions, normal order is from left to right, reverse order is from right to left.

Figure 7:
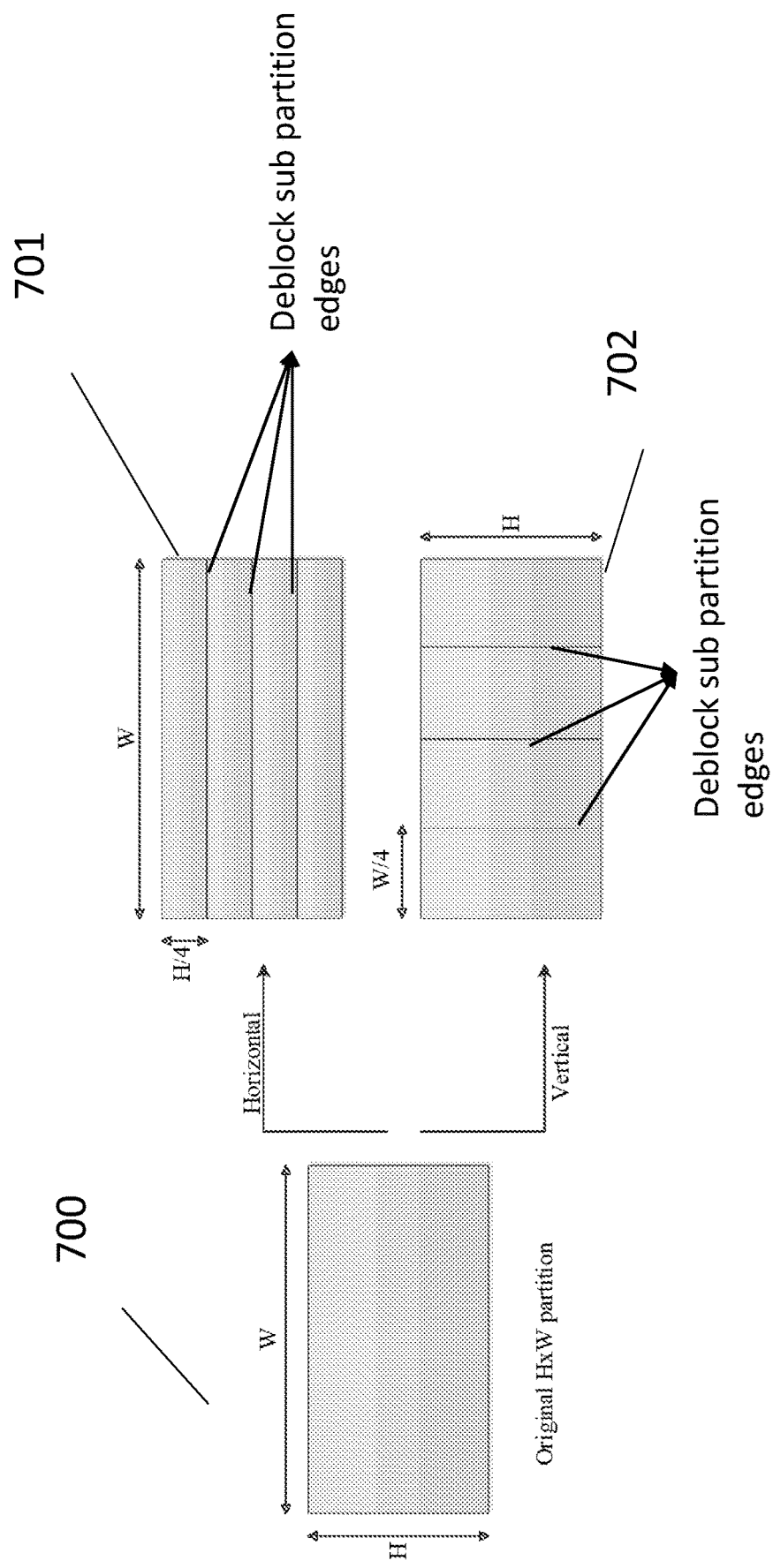
FIG. 7 is a block diagram illustrating another example of deblocking sub-partition edges within a CU which uses an Intra sub-partition (ISP) tool.

As shown in FIG. 7, in order to reduce the block artifacts caused by the ISP coding tool, sub-partition boundaries inside a block applied with ISP are deblocking filtered after horizontal partitioning of a coding block 700 into sub-partitions 701 or after vertical partitioning of a coding block 700 into sub-partitions 702. Several alternative methods are proposed to apply deblocking filters on these sub-partition boundaries.

Deblocking Filtering with Increased Boundary Strength.

Boundary strength (Bs) is a parameter that is used to control the intensity of deblocking filter. With a higher value of Bs, more samples perpendicular to a boundary can be filtered. The prediction of ISP might results in a problem of error propagation, namely, the prediction error is propagated with the processing order.

In one example as shown in FIG. 6, with vertical partition and normal processing order of a coding block (coding unit), samples in these sub-partitions are reconstructed from left to right, namely, sub0, sub1, sub2, and sub3. Sub-partition 0 in general might have better prediction quality, as its reference samples (from the left neighboring block and top neighboring block) have been already reconstructed. However, the left part of reference samples of sub-partition 1 is from reconstructed sub-partition 0, therefore, sub-partition 1's reference samples might not as accurate as sub-partition 0's, resulting in more residual signal. Similarly, the reference samples of sub-partition 2 is further inferior to sub-partition 1's, and prediction error propagated with the processing order.

A method of increasing boundary strength with the processing order is proposed. Namely, when a boundary between two sub-partitions (for example boundary A, B, C in FIG. 6) is closer to neighboring blocks, then the Bs for this boundary is set to a smaller value, since the boundary has less error. When a boundary is farther from neighboring blocks, then the Bs for this boundary is set to a higher value, as the boundary has more error because of error propagation.

In one example as shown in FIG. 6, with vertical partition and normal (from left to right) processing order is performed to the block, the Bs of sub-partition boundary A is set to 0, the Bs of sub-partition boundary B is set to 1, the Bs of sub-partition boundary C is set to 2.

In one example as shown in FIG. 6, with vertical partition and reverse (from right to left) processing order is performed to the block, the Bs of sub-partition boundary A is set to 2, the Bs of sub-partition boundary B is set to 1, the Bs of sub-partition boundary C is set to 0.

In other examples, a similar process is performed for horizontal partitions.

Deblocking Filtering Based on the Coded Block Flag (CBF).

In an example, each sub-partition is predicted and reconstructed separately, each sub-partition might have different residual (the difference between the original signal and predicted signal) information. In particular, a coded block flag (CBF) is used to indicate whether a block or a sub-partition has residual data or not after quantization. In general, a block with CBF equals to 1 (i.e. there is residual data after quantization) has more distortion than a block with CBF equals to 0 (i.e. there is no residual data after quantization). This embodiment applies deblocking filter on a boundary between two sub-partitions based on the CBF flag of its two neighboring sub-partitions.

In one example, if each of the two sub-partitions of a sub-partition boundary has a CBF flag value equals to 0, then no deblocking filter is applied, otherwise (if at least one of the two sub-partitions of a sub-partition boundary has a CBF flag value equals to 1) deblocking filter is applied, the Bs value of the sub-partition boundary is set to 1. Raising an example in FIG. 6, if each of the sub-partition 0 and 1 has a CBF flag equals to 0, then no deblocking filter is applied for the sub-partition boundary A. If at least sub-partition 0 and 1 has a CBF flag equals to 1, then deblocking filter is applied for the sub-partition boundary A, with Bs set to 1.

In one example, if each of the two sub-partitions of a sub-partition boundary has a CBF flag value equals to 0, then no deblocking filter is applied, otherwise (if at least one of the two sub-partitions of a sub-partition boundary has a CBF flag value equals to 1) deblocking filter is applied, with the Bs value of the sub-partition boundary is set to 2. Raising an example in FIG. 6, if each of sub-partition 0 and 1 has a CBF flag equals to 0, then no deblocking filter is applied for the sub-partition A. If at least sub-partition 0 and 1 has a CBF flag equals to 1, then deblocking filter is applied for the sub-partition boundary A, with Bs set to 2.

Constant Boundary Strength setting for sub-partition boundaries.

In one example, for all sub-partition boundaries A, B, and C showed in FIG. 6, a constant Boundary strength (Bs) is set to 1.

In another example, for all sub-partition boundaries A, B, and C showed in FIG. 6, a constant Boundary strength (Bs) is set to 2.

Figure 8:
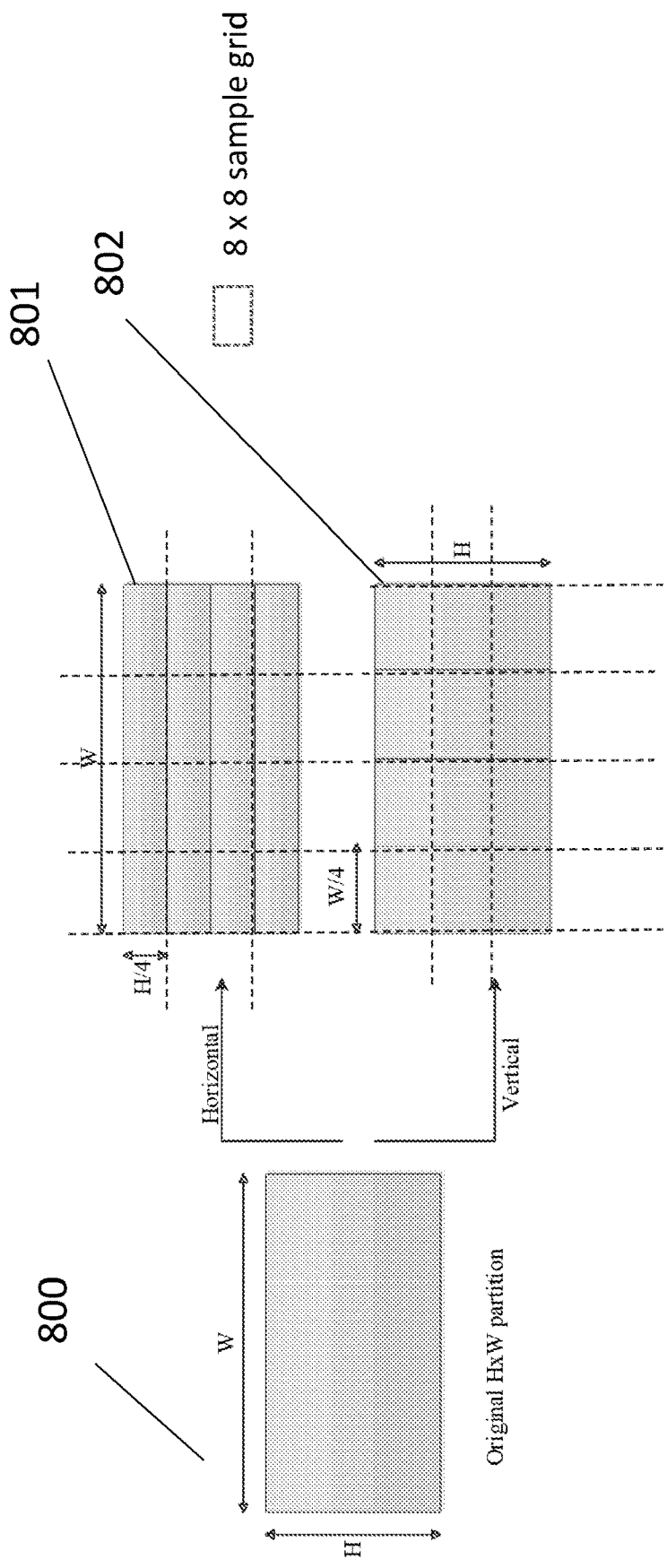
FIG. 8 is a block diagram illustrating an example of deblocking sub-partition edges within a CU which overlap with an 8×8 sample grid.

As shown in FIG. 8, according to another example, after horizontal partitioning of a coding block 800 into sub-partitions 801 or after vertical partitioning of a coding block 800 into sub-partitions 802, only sub-partition boundaries which overlap with an 8×8 sample grid are deblocked and the rest of the sub-partition edges are not deblocked. This has the advantage of reduced computational complexity as only a few of the edges are deblocked.

Figure 9:
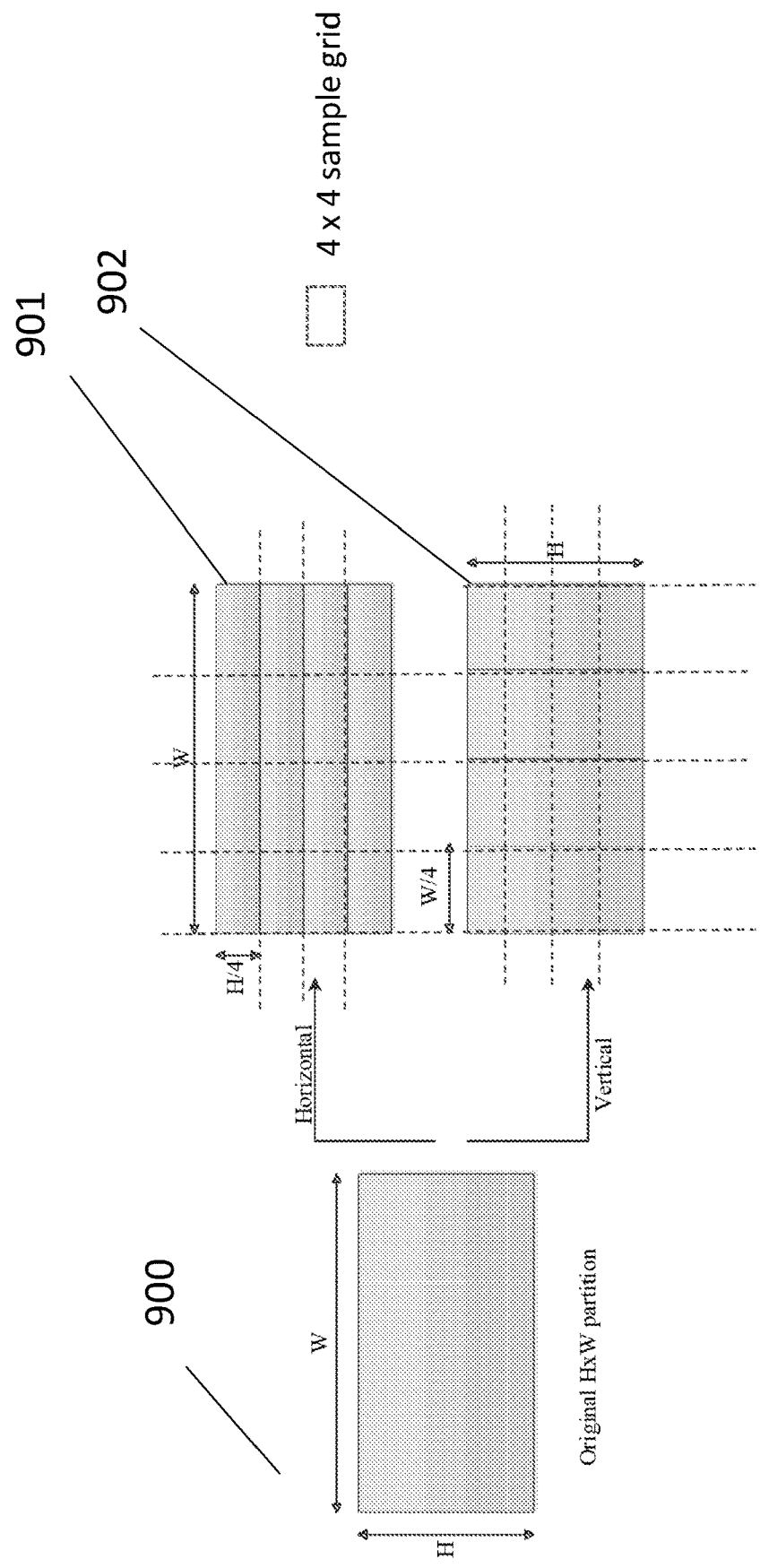
FIG. 9 is a block diagram illustrating an example of deblocking all sub-partition edges within a CU which overlap with a 4×4 sample grid.

Another alternative is shown in FIG. 9. In this case, after horizontal partitioning of a coding block 900 into sub-partitions 901 or after vertical partitioning of a coding block 900 into sub-partitions 902, all sub-partition boundaries which overlap with a 4×4 sample grid are deblocked.

A coordinator of a position is defined as (x, y), x represents how many samples away from the top-left sample of the whole frame in the horizontal direction; y represents how many samples away from the top-left sample of the whole frame in the vertical direction. The coordinator of the top-left sample of the whole frame is (0, 0).

In one example, an 8×8 sample grid can start from a position of (x, y), where x %8==0. The operation % means modular operation, defined as the remainder of x divided by 8.

In one example, an 8×8 sample grid can start from a position of (x, y), where x %8==4. The operation % means modular operation, defined as the remainder of x divided by 8.

In one example, an 8×8 sample grid can start from a position of (x, y), where y %8==0. The operation % means modular operation, defined as the remainder of y divided by 8.

In one example, an 8×8 sample grid can start from a position of (x, y), where y %8==4. The operation % means modular operation, defined as the remainder of y divided by 8.

Dealing with Smaller Blocks

Figure 10:
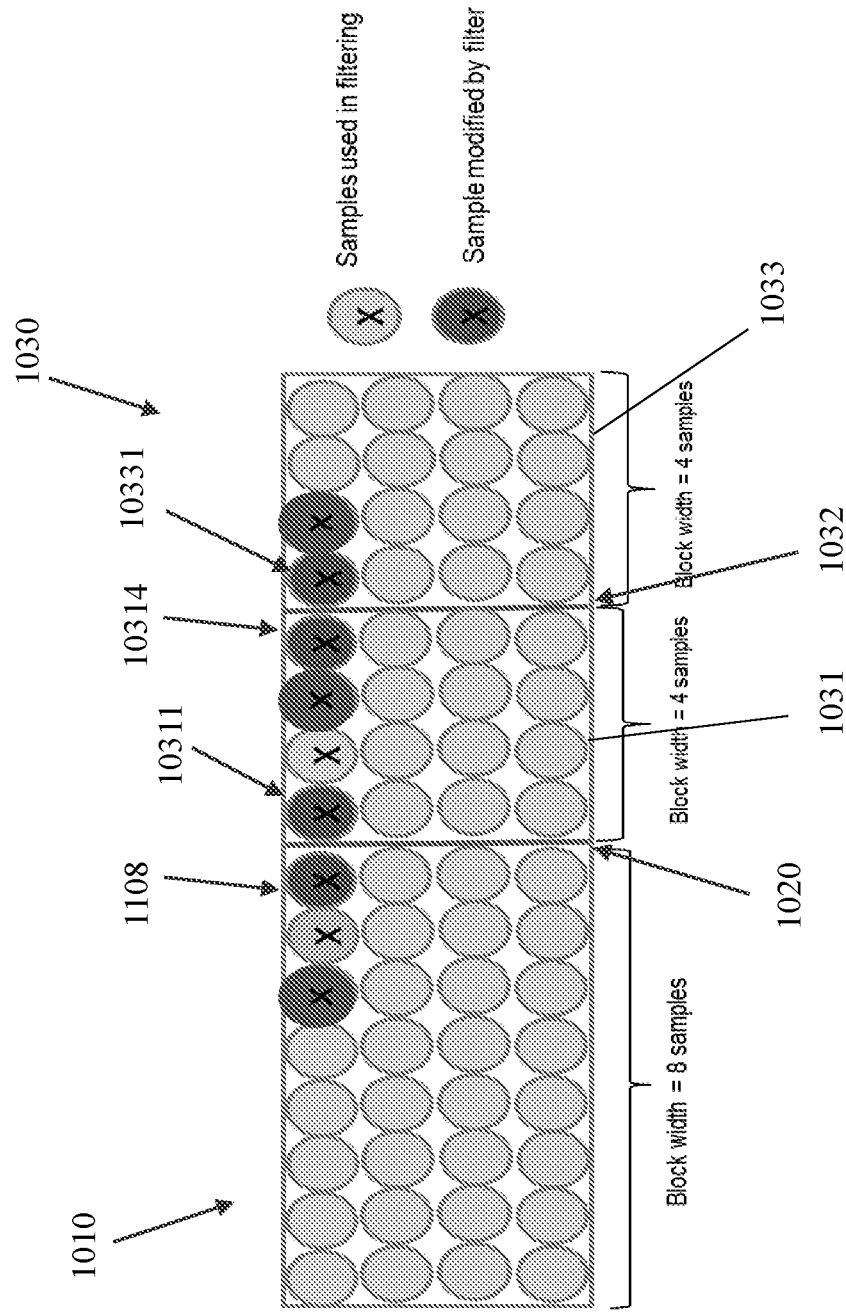
FIG. 10 is a block diagram illustrating an example according to which when sub-partitions size is <8 samples orthogonally in the direction of deblocking, then a weak filter which only uses 3 samples in deblocking decision and which modifies only one sample is used.

Application of ISP may result in sub-partitions with height or width of 4 samples. In the example shown in FIG. 6 using the vertical partition, if the W is 16 samples, then each sub-partition is 4 samples wide. In this case, as shown in FIG. 10, a weak filter that only modifies up to one sample 10314 or 10331 along the sub-partition boundaries 1032 between the sub-partition 1031 and the sub-partition 33 can be used. In the example shown in FIG. 10, filtering is performed in each row of the sub-partitions 1031, 1033 that is perpendicular to and adjacent to the sub-partitions boundary 1032 between the sub-partition 1031 and the sub-partition 1033, for example. As shown in FIG. 10, a weak filter that only modifies up to one sample 1108 or 10311 along the edge 1020 between the neighboring block 1010 and the current block 1030 can be used. In another example shown in FIG. 10, filtering is performed in each row of the sub-partition 1031 or the neighboring block 1010 that is perpendicular to and adjacent to the edge 1020 between the neighboring block 1010 and the sub-partition 1031 of the block 1030, for example. Otherwise (if the sub-partition height/width orthogonal to sub-partition boundaries is larger than 4 samples, then the normal VVC JVET-L1001 version 13(http://phenix.it-sudparis.eu/jvet/doc_end_user/current_document.php?id=4834) deblocking filter (for example, a deblocking filter disclosed in the above VVC document) may be used.

In another embodiment, for any one of above embodiments and examples, when sub-partition boundaries are not aligned with an 8×8 grid, then deblocking filter is not applied.

The details of the Intra sub-partition related definition of the proposed method are described as follows in the format of the specification of the VVC draft (part 7.3.9.5 and 7.4.10.5):

7.3.9.5 Coding Unit Syntax

| | |
|---|---|
| ... | |
| intra_subpartitions_mode_flag[ x0 ][ y0 ] | ae(v) |
| if( intra_subpartitions_mode_flag[ x0 ][ y0 ]  = =  1 ) | |
|    intra_subpartitions_split_flag[ x0 ][ y0 ] | ae(v) |
| ... | |

7.4.10.5 Coding Unit Semantics intra_subpartitions_mode_flag[x0][y0] equal to 1 specifies that the current intra coding unit is partitioned into NumIntraSubPartitions[x0] [y0] rectangular transform block subpartitions. intra_subpartitions_mode_flag[x0][y0] equal to 0 specifies that the current intra coding unit is not partitioned into rectangular transform block subpartitions.

When intra_subpartitions_mode_flag[x0][y0] is not present, it is inferred to be equal to 0. intra_subpartitions_split_flag[x0][y0] specifies whether the intra subpartitions split type is horizontal or vertical. When intra_subpartitions_split_flag[x0] [y0] is not present, it is inferred as follows:

If cbHeight is greater than MaxTbSizeY, intra_subpartitions_split_flag[x0][y0] is inferred to be equal to 0.

Otherwise (cbWidth is greater than MaxTbSizeY), intra_subpartitions_split_flag[x0][y0] is inferred to be equal to 1.

The variable IntraSubPartitionsSplitType specifies the type of split used for the current luma coding block as illustrated in Table 13. IntraSubPartitionsSplitType is derived as follows:

If intra_subpartitions_mode_flag[x0][y0] is equal to 0, IntraSubPartitionsSplitType is set equal to 0.

Otherwise, the IntraSubPartitionsSplitType is set equal to 1+intra_subpartitions_split_flag[x0][y0].

TABLE 13

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block subpartitions into which an intra luma coding block is divided. NumIntraSubPartitions is derived as follows:
  If IntraSubPartitionsSplitType is equal to ISP_NO_SPLIT, NumIntraSubPartitions is set equal to 1.
  Otherwise, if one of the following conditions is true, NumIntraSubPartitions is set equal to 2:
    cbWidth is equal to 4 and cbHeight is equal to 8,
    cbWidth is equal to 8 and cbHeight is equal to 4.
  Otherwise, NumIntraSubPartitions is set equal to 4.

Figure 11:
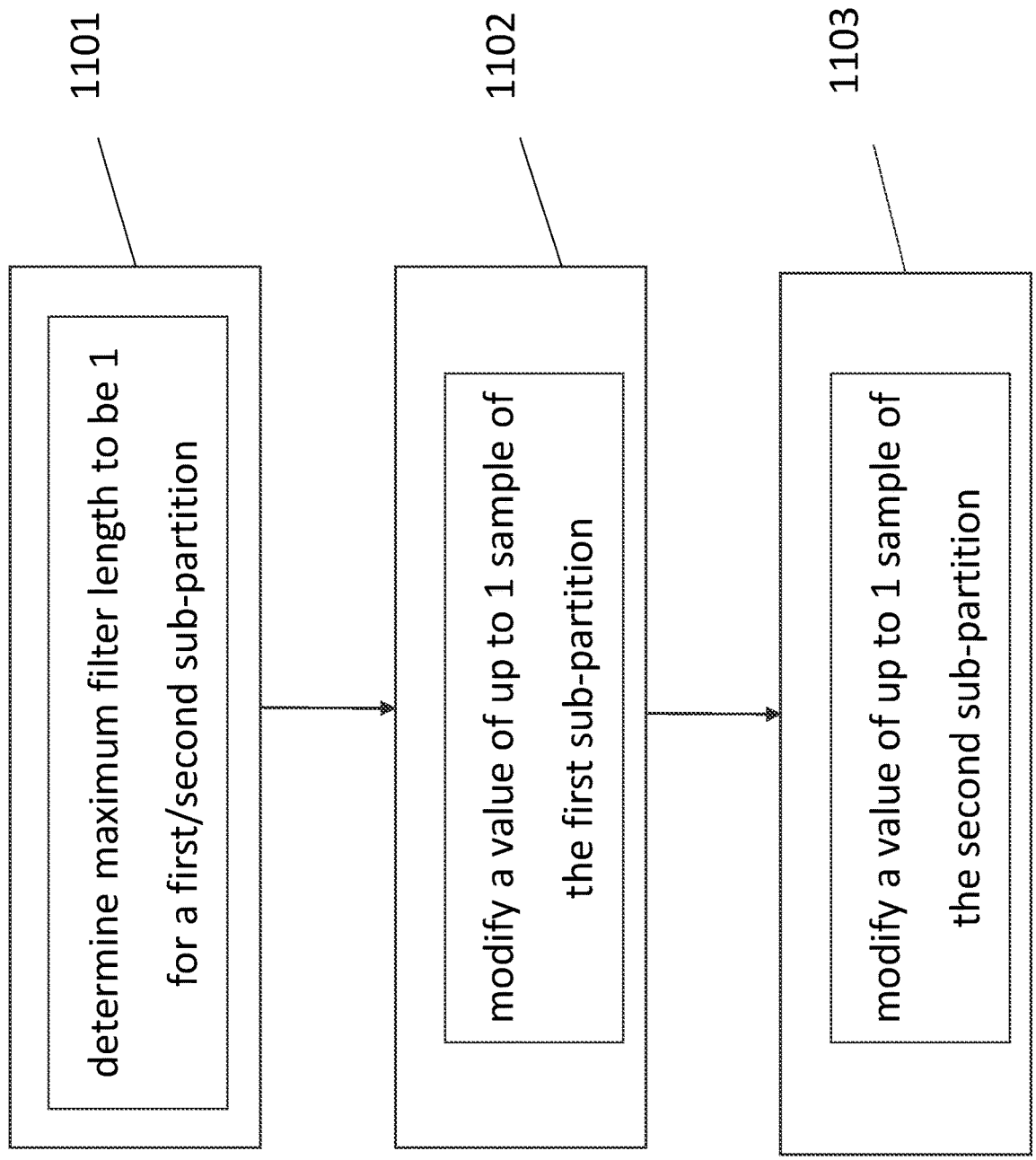
FIG. 11 shows a flow diagram depicting an exemplary process for deblocking filtering.

FIG. 11 is a flowchart of a deblocking method, for deblocking sub-partitions boundary within a coding block in an image encoding and/or an image decoding, wherein the current coding block is coded in intra prediction mode and the current coding block is partitioned into sub-partitions comprising a first sub-partition and a second sub-partition which is adjacent to the first sub-partition, wherein the second sub-partition is intra predicted based on the first sub-partition. Further details of the method will be described above, e.g., with respect to FIGS. 6 to 10.

At step 1101, determining a first maximum filter length to be 1 for the first sub-partition and/or a second maximum filter length to be 1 for the second sub-partition when a width of the first sub-partition is 4 samples or a width of the second sub-partition is 4 samples, or when a height of the first sub-partition is 4 samples or a height of the second sub-partition is 4 samples;

At step 1103, modifying a value of up to one sample of the first sub-partition, wherein the up to one sample is obtained from a row or column of the first sub-partition that is perpendicular to and adjacent to the sub-partitions boundary between the first sub-partition and the second sub-partition; and/or At step 1105, modifying a value of up to one sample of the second sub-partition, wherein the up to one sample is obtained from a row or column of the second sub-partition that is perpendicular to and adjacent to the sub-partitions boundary between the first sub-partition and the second sub-partition.

Based on the above, the present disclosure allows for modifying a small number of sample values at the sub-partition boundary, and therefore the method can reduce the blocking artifact that might be caused by sub-partition boundaries in a block applied with ISP, thus it improves the coding efficiency.

Figure 12:
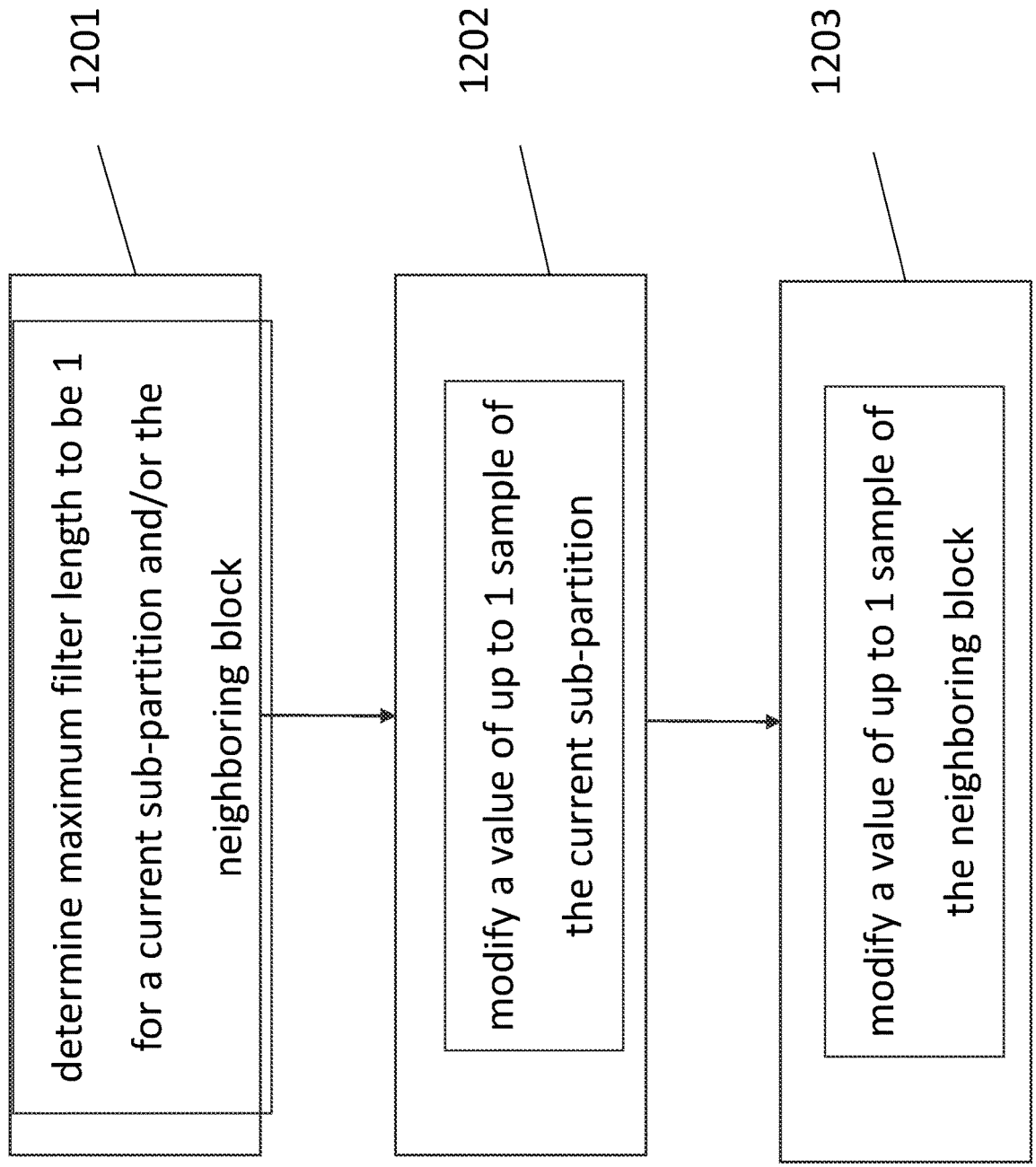
FIG. 12 shows a flow diagram depicting another exemplary process for deblocking filtering.

FIG. 12 is a flowchart of a deblocking method, for deblocking block edges between image blocks in an image encoding and/or an image decoding, wherein the block edges comprise an edge between a current sub-partition of a current coding block and a neighboring block of the current coding block, wherein the current coding block is coded in intra prediction mode and the current coding block is partitioned into sub-partitions; Further details of the method will be described above, e.g., with respect to FIGS. 6 to 10.

At step 1201, determining a third maximum filter length to be 1 for the current sub-partition and/or a fourth maximum filter length to be 1 for the neighboring block when a width of the current sub-partition is 4 samples or a height of the current sub-partition is 4 samples;

At step 1202, modifying a value of up to one sample of the current sub-partition, wherein the up to one sample is obtained from a row or column of the current sub-partition that is perpendicular to and adjacent to the edge between the current sub-partition and the neighboring block; and/or At step 1203, modifying a value of up to one sample of the neighboring block, wherein the up to one sample is obtained from a row or column of the neighboring block that is perpendicular to and adjacent to the edge between the current sub-partition and the neighboring block.

Based on the above, the present disclosure allows for modifying a small number of sample values at the sub-partition boundary, and therefore the method can reduce the blocking artifact that might be caused by sub-partition boundaries in a block applied with ISP while avoiding filtering overlaps between a block edge and a sub-partition boundary to a certain extent, thus it improves the coding efficiency.

Figure 13:
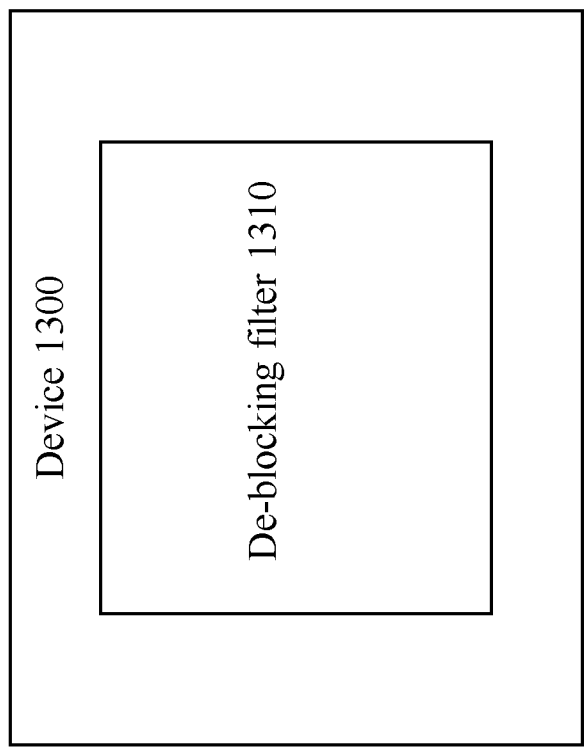
FIG. 13 shows a schematic diagram of a device for de-blocking sub-partitions boundary within a coding block.

FIG. 13 is a block diagram illustrating an exemplary device 1300 for de-blocking sub-partitions boundary within a coding block according to the techniques described in this disclosure (further details will be described below, e.g., based on FIGS. 2 and 3 and FIGS. 6 to 10). The device for use in an image encoder and/or an image decoder, for deblocking sub-partitions boundary within a coding block, wherein the current coding block is coded in intra prediction mode and the current coding block is partitioned into sub-partitions comprising a first sub-partition and a second sub-partition which is adjacent to the first sub-partition, in an example, the second sub-partition is intra predicted based on the first sub-partition;
  wherein the device 1300 comprises a de-blocking filter 1310 configured to:
    determine a first maximum filter length to be 1 for the first sub-partition and/or a second maximum filter length to be 1 for the second sub-partition when a width of the first sub-partition is 4 samples or a width of the second sub-partition is 4 samples, or when a height of the first sub-partition is 4 samples or a height of the second sub-partition is 4 samples;
    modify a value of up to one sample of the first sub-partition, wherein the up to one sample is obtained from a row or column of the first sub-partition that is perpendicular to and adjacent to the sub-partitions boundary between the first sub-partition and the second sub-partition; and/or
    modify a value of up to one sample of the second sub-partition, wherein the up to one sample is obtained from a row or column of the second sub-partition that is perpendicular to and adjacent to the sub-partitions boundary between the first sub-partition and the second sub-partition.

Figure 14:
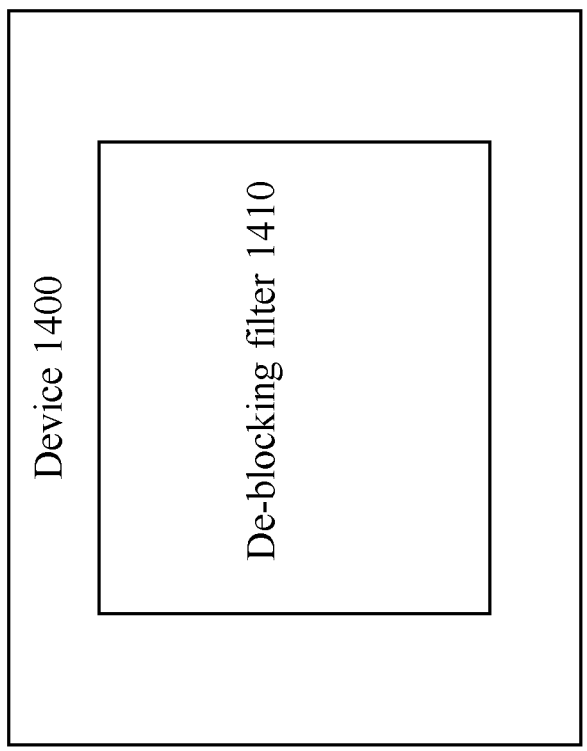
FIG. 14 shows a schematic diagram of a device for de-blocking block edges.

FIG. 14 is a block diagram illustrating an exemplary device 1400 for de-blocking block edges according to the techniques described in this disclosure (further details will be described below, e.g., based on FIGS. 2 and 3 and FIGS. 6 to 10). The device for use in an image encoder and/or an image decoder, wherein the block edges comprises an edge between a current sub-partition of a current coding block and a neighboring block of the current coding block, wherein the current coding block is coded in intra prediction mode and the current coding block is partitioned into sub-partitions;
  wherein the device 1400 comprises a de-blocking filter 1410 configured to:
    determine a third maximum filter length to be 1 for the current sub-partition and/or a fourth maximum filter length to be 1 for the neighboring block when a width of the current sub-partition is 4 samples or a height of the current sub-partition is 4 samples;
    modify a value of up to one sample of the current sub-partition, wherein the up to one sample is obtained from a row or column of the current sub-partition that is perpendicular to and adjacent to the edge between the current sub-partition and the neighboring block; and/or modify a value of up to one sample of the neighboring block, wherein the up to one sample is obtained from a row or column of the neighboring block that is perpendicular to and adjacent to the edge between the current sub-partition and the neighboring block.

Figure 15:
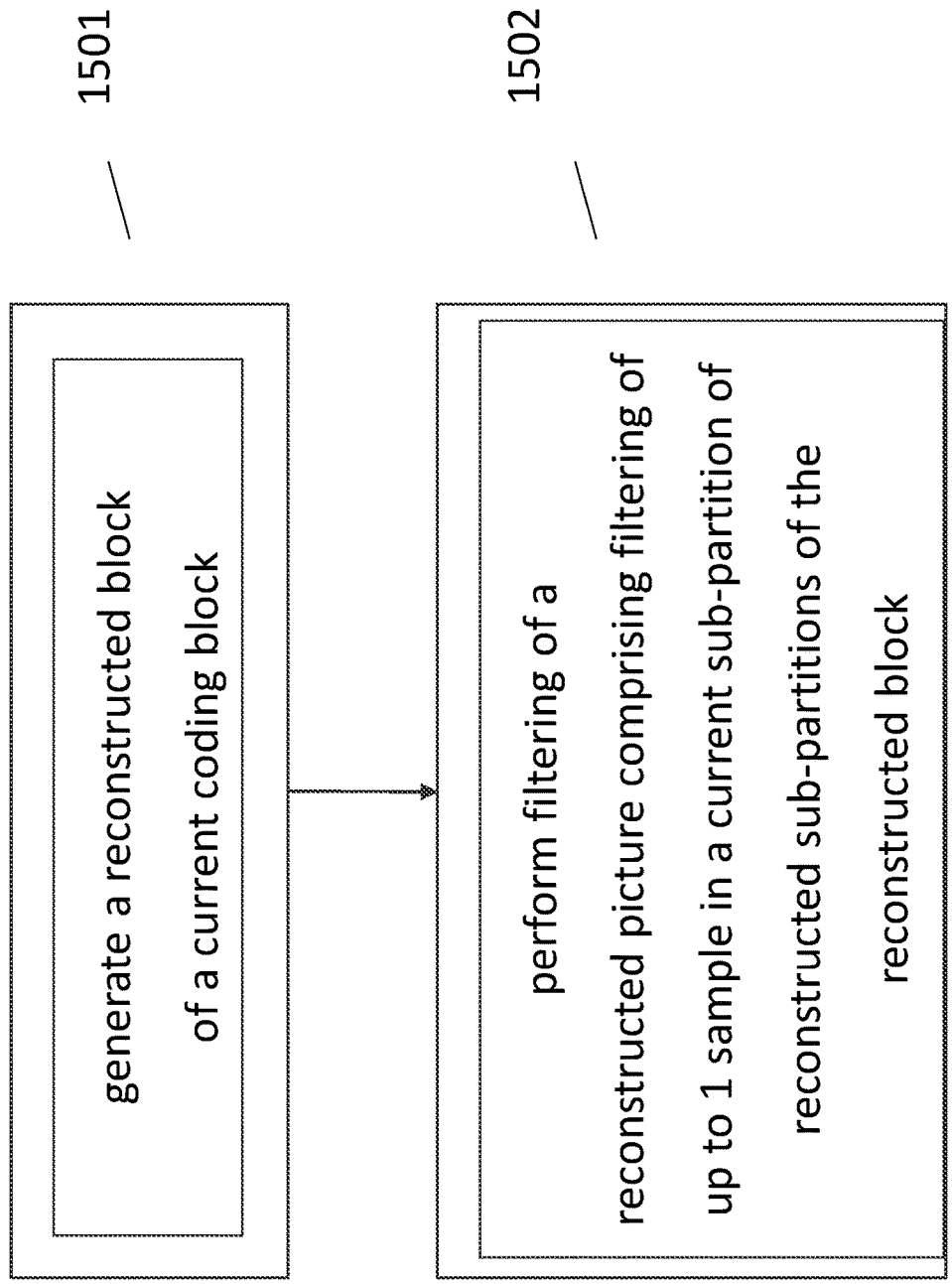
FIG. 15 shows a flow diagram depicting an exemplary process of coding implemented in a decoding device or an encoding device.

FIG. 15 is a flowchart of a method of coding implemented in a decoding device or an encoding device.

At step 1501, generating a reconstructed block of a current coding block which belongs to a current picture, wherein the current coding block is coded in intra prediction mode and the current coding block is partitioned into sub-partitions comprising a first sub-partition and a second sub-partition, wherein the second sub-partition is intra predicted based on the first sub-partition; and At step 1502, performing filtering on a reconstructed picture of the current picture, wherein the performing filtering on the reconstructed picture of the current picture comprises: filtering up to one sample in a current sub-partition of reconstructed sub-partitions of the reconstructed block when a height of the current sub-partition is 4 samples or when a width of the current sub-partition is 4 samples, wherein the one sample is positioned in a row or column of the current sub-partition perpendicular to a boundary between the current sub-partition and another sub-partition that is positioned adjacent to the current sub-partition and the one sample is adjacent to the boundary.

In some implementation form of the embodiment, wherein a value of the one sample, which is obtained from the column of the current sub-partition that is perpendicular to and adjacent to the boundary between the current sub-partition and said another sub-partition that is below or top of the current sub-partition, is modified when a height of the current sub-partition is 4 samples if an intra sub-partitions split type of partitioning the current coding block into sub-partitions is horizontal.

In some implementation form of the embodiment, wherein the value of the one sample, which is obtained from the row of the current sub-partition that is perpendicular to and adjacent to the boundary between the current sub-partition and said another sub-partition that is left or right to the current sub-partition, is modified when a width of the current sub-partition is 4 samples if an intra sub-partitions split type of partitioning the current coding block into sub-partitions is vertical.

In some implementation form of the embodiment, wherein if the intra sub-partitions split type of partitioning the current coding block into sub-partitions is horizontal, the boundary between the current sub-partition and said another sub-partition that is positioned adjacent to the current sub-partition is a horizontal sub-partitions boundary; or if the intra sub-partitions split type of partitioning the current coding block into sub-partitions is vertical, the boundary between the current sub-partition and said another sub-partition that is positioned adjacent to the current sub-partition is a vertical sub-partitions boundary.

In some implementation form of the embodiment, wherein if the intra sub-partitions split type of partitioning the current coding block into sub-partitions is vertical, the first sub-partition is left to the second sub-partition and the second sub-partition is intra predicted based on a reconstructed value of the first sub-partition; if the intra sub-partitions split type of partitioning the current coding block into sub-partitions is horizontal, the first sub-partition is atop of the second sub-partition and the second sub-partition is intra predicted based on a reconstructed value of the first sub-partition.

In some implementation form of the embodiment, wherein the current sub-partition is a reconstructed version of the first sub-partition or a reconstructed version of the second sub-partition.

In some implementation form of the embodiment, wherein the number of sub-partitions is 2 or 4.

In some implementation form of the embodiment, wherein
if a width of the coding block is equal to 4 and a height of the coding block is equal to 8 and/or if the width of the coding block is equal to 8 and the height of the coding block is equal to 4, the number of sub-partitions is 2, Otherwise, the number of sub-partitions is 4.

In a further possible implementation form of the embodiment, wherein the filtering of the up to one sample in the current sub-partition is performed only if the boundary between the current sub-partition and the other sub-partition overlaps with an n×n sample grid of the reconstructed block wherein n is an integer. For example, n=4 or n=8. Thereby, the computational load may be even further reduced.

In a further possible implementation form of the embodiment, wherein the filtering of up to one sample in the current sub-partition is performed only when the heights of all of the sub-partitions are 4 samples or when the widths of all of the sub-partitions are 4 samples. Thereby, the computational load of the overall coding process may be further reduced.

In particular, wherein the sub-partitions are rectangular transform block sub-partitions. When ISP is divided, each sub-partition is a transform block.

In the present disclosure, wherein the coding block is coded using an Intra sub-partition, ISP, tool.

In a further possible implementation form of the embodiment, wherein the order of intra predicting the sub-partitions is from left to right or from right to left if the intra subpartitions split type of partitioning the current coding block into sub-partitions is vertical (e.g. the partitioning of the prediction block into the sub-partitions may be performed in a vertical direction), or wherein the order of intra predicting the at sub-partitions is from top to down or from down to top if the intra subpartitions split type of partitioning the current coding block into sub-partitions is horizontal (the partitioning of the prediction block into the sub-partitions may be performed in a horizontal direction).

In particular, the current sub-partition is a reconstructed version (i.e. reconstructed values) of the first sub-partition or a reconstructed version (i.e. reconstructed values) of the second sub-partition. The number of sub-partitions can be 2 or 4, for example.

The coding block may be coded using an Intra sub-partition, ISP, tool. The ISP coding tool only applies to the coding block with intra prediction. The partitioning of the coding block/intra prediction block may result in 1D sub-partitions or a line of sub-partitions. If the method is for use in an image encoding, the generation of the reconstructed block is based on the following process flow (as it is known in the art): calculation of a residual block based on a current block (i.e. an original block) and the intra prediction block, transform and quantization of the residual coefficients of the residual block, inverse quantization and inverse transform in order to obtain a reconstructed residual block (see also detailed description below). The reconstructed block is obtained based on the reconstructed residual block and the prediction block. If the method is for use in an image decoding, the generation of the reconstructed block is based on the following process flow (as it is known in the art): obtaining residual coefficients of a residual block based on information included in the received bitstream, transform and quantization of the residual coefficients of the residual block, inverse quantization and inverse transform in order to obtain a reconstructed residual block (see also detailed description below). The reconstructed block is obtained based on the reconstructed residual block and the prediction block. Furthermore, the reconstructed picture of a current image comprising the current block is input into a filtering process, in block-based image coding scheme, by filtering up to one sample a filtering of a boundary comprising modifying up to one sample adjacent to the block boundary is meant. Decision of this kind of deblocking may be based on only three samples (neighbored in the same row for filtering of boundaries between vertical sub-partitions or neighbored in the same column for filtering of boundaries between horizontal sub-partitions; see also detailed description above).

In general, boundary strengths of all boundaries between the sub-partitions of the coding block may be set to a constant value indicating the strength of the filtering process (for example, 2) in order to simplify the overall processing.

The weak filtering employed according to embodiments of the invention (up to one sample) allows for reducing block artifacts in small blocks without the need for an unnecessary high computational load and memory resources.

Figure 16:
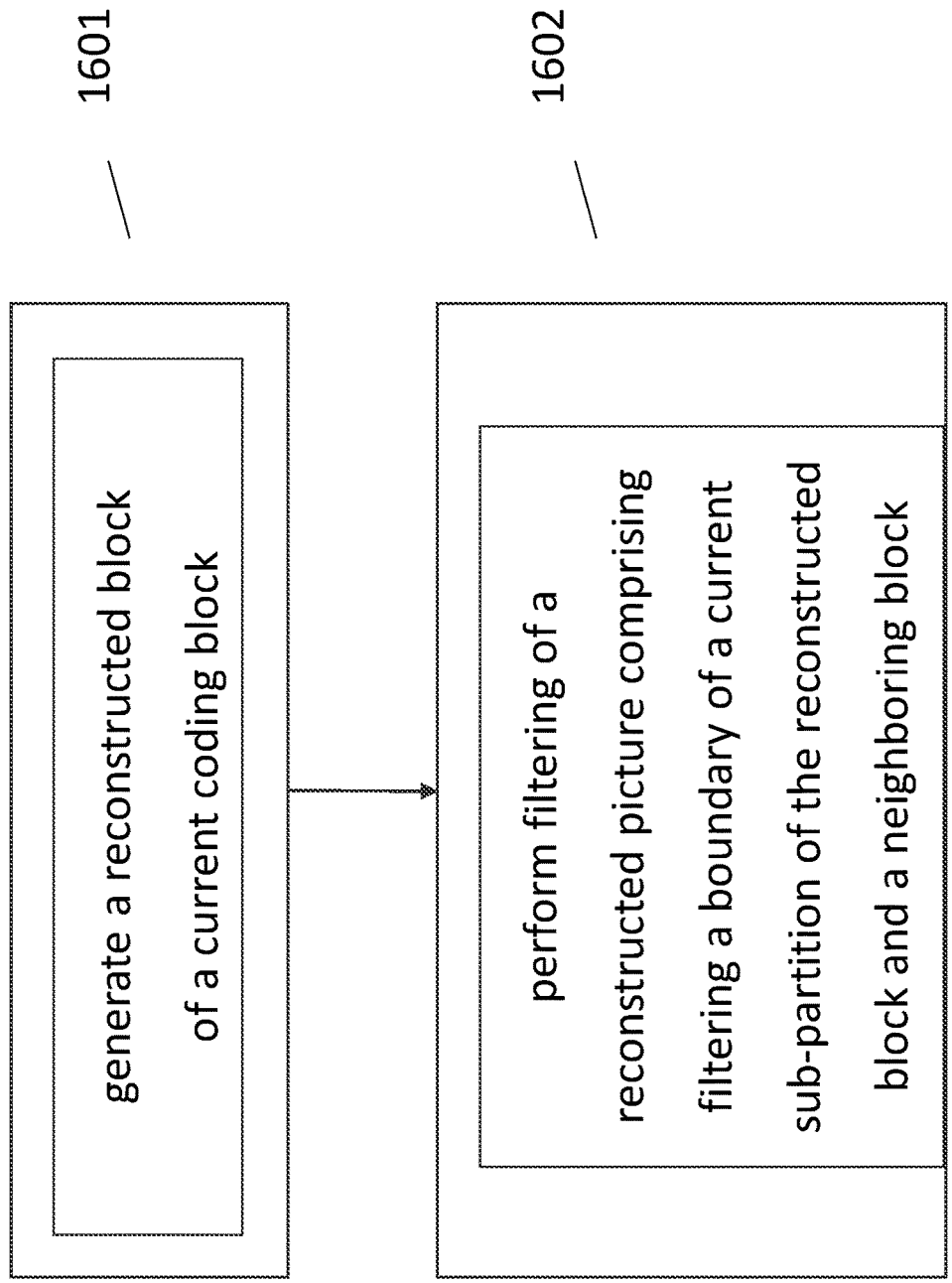
FIG. 16 shows a flow diagram depicting another exemplary process of coding implemented in a decoding device or an encoding device.

FIG. 16 is a flowchart of another method of coding implemented in a decoding device or an encoding device.

At step 1601, generating a reconstructed block of a current coding block which belongs to a current picture, wherein the current coding block is coded in intra prediction mode and the current coding block is partitioned into sub-partitions comprising a first sub-partition and a second sub-partition, wherein the second sub-partition is intra predicted based on the first sub-partition; and At step 1603, performing filtering on a reconstructed picture of the current picture, wherein the performing filtering on the reconstructed picture of the current picture comprises: filtering a boundary between a current sub-partition of the reconstructed block and a neighboring block which is adjacent to the current sub-partition (i.e. a neighboring block of the current block), based on a maximum filter length of the current sub-partition and a maximum filter length of the neighboring block, and the maximum filter length of the current sub-partition and the maximum filter length of the neighboring block being 1 when a height of the current sub-partition is 4 samples or when a width of the current sub-partition is 4 samples.

In an example, wherein the step 1203 may include:
modifying, based on the maximum filter length MA of the current sub-partition, one sample value of the current sub-partition adjacent to the boundary; and
modifying, based on the maximum filter length MB of the neighboring block, sample values of the neighboring block adjacent to the boundary.

MA=1,MB=1.

In particular, the step 1203 may include:
modifying at most a number MA of sample value of the current sub-partition and the at most a number MA of the sample is in a line perpendicular to and adjacent to the boundary, MA=1; and wherein the modifying, based on a maximum filter length MB, sample values of the neighboring block adjacent to the boundary, comprises:
modifying at most a number MB of sample values of the neighboring block and the at most a number MB of the samples are in a line perpendicular to and adjacent to the boundary, MB=1.

Here, the maximum filter length of the current sub-partition refers to the number of samples allowed to be modified in the filtering process for the current sub-partition. The maximum filter length of the neighboring block refers to the number of samples allowed to be modified in the filtering process for the neighboring block.

In some implementation form of the embodiment, wherein the first sub-partition is intra predicted based on another reconstructed block that is positioned adjacent to the coding block.

In a further possible implementation form of the embodiment, wherein the filtering is performed only if the boundary overlaps with an n×n sample grid of the reconstructed block wherein n is an integer. For example, n is 4 or 8.

In some implementation form of the embodiment, wherein the value of one sample, which is obtained from the column of the current sub-partition that is perpendicular to and adjacent to the boundary between the current sub-partition and said neighboring block that is below or top of the current sub-partition, is modified when a height of the current sub-partition is 4 samples if an intra sub-partitions split type of partitioning the current coding block into sub-partitions is horizontal.

In some implementation form of the embodiment, wherein the value of one sample, which is obtained from the row of the current sub-partition that is perpendicular to and adjacent to the boundary between the current sub-partition and said neighboring block that is left or right to the current sub-partition, is modified when a width of the current sub-partition is 4 samples if an intra sub-partitions split type of partitioning the current coding block into sub-partitions is vertical.

In some implementation form of the embodiment, wherein if the intra sub-partitions split type of partitioning the current coding block into sub-partitions is horizontal, the boundary between the current sub-partition and said neighboring block that is positioned adjacent to the current sub-partition is a horizontal boundary; or if the intra sub-partitions split type of partitioning the current coding block into sub-partitions is vertical, the boundary between the current sub-partition and said neighboring block that is positioned adjacent to the current sub-partition is a vertical boundary.

In some implementation form of the embodiment, wherein if the intra sub-partitions split type of partitioning the current coding block into sub-partitions is vertical, the first sub-partition is left to the second sub-partition and the second sub-partition is intra predicted based on a reconstructed value of the first sub-partition; if the intra sub-partitions split type of partitioning the current coding block into sub-partitions is horizontal, the first sub-partition is top of the second sub-partition and the second sub-partition is intra predicted based on a reconstructed value of the first sub-partition.

In particular, the number of sub-partitions is 2 or 4. When the number of sub-partitions is 2, corresponding, there are the first sub-partition and the second sub-partition inside the current block and the current sub-partition may be a reconstructed version of the first sub-partition or a reconstructed version of the second sub-partition.

When the number of sub-partitions is 4, correspondingly, there are the first sub-partition, the second sub-partition, the third sub-partition and the fourth sub-partition inside the current block and the current sub-partition may be a reconstructed version of the first sub-partition or a reconstructed version of the fourth sub-partition.

It can be understood that the first sub-partition, the second sub-partition, the third sub-partition, and the fourth sub-partition are merely used for differently the sub-partitions. In some cases, the heights of all of the sub-partitions are 4 samples or the widths of all of the sub-partitions are 4 samples.

In a further possible implementation form of the embodiment, wherein
if a width of the coding block is equal to 4 and a height of the coding block is equal to 8 and/or if the width of the coding block is equal to 8 and the height of the coding block is equal to 4, the number of sub-partitions is 2,
Otherwise, the number of sub-partitions is 4.

In a further possible implementation form of the embodiment, wherein the filtering is performed only if the boundary overlaps with an n×n sample grid of the reconstructed block wherein n is an integer. For example, n is 4 or 8.

In particular, wherein the sub-partitions are rectangular transform block sub-partitions.

In the present disclosure, wherein the coding block is coded using an Intra sub-partition, ISP, tool.

Figure 17:
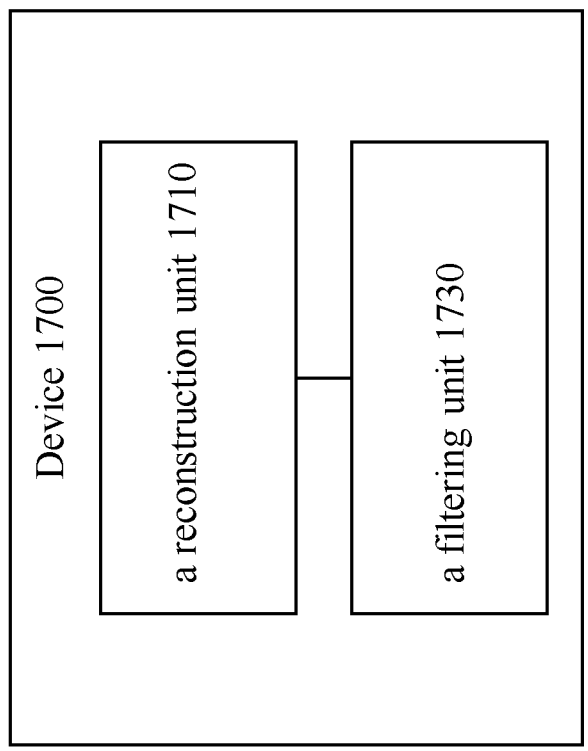
FIG. 17 shows a schematic diagram of a device for video coding.

FIG. 17 is a block diagram illustrating an exemplary device 1700 according to the techniques described in this disclosure (further details will be described below, e.g., based on FIGS. 6-10, and FIG. 15). The device is intended for use in an image encoder and/or an image decoder. In an example, the device 1700 may be corresponding to the encoder in FIG. 2. In another example, the device 1700 may be corresponding to the decoder in FIG. 3. The device may include:
a reconstruction unit 1701 configured to generate a reconstructed block of a current coding block which belongs to a current picture, wherein the current coding block is coded in intra prediction mode and the current coding block is partitioned into sub-partitions comprising a first sub-partition and a second sub-partition, wherein the second sub-partition is intra predicted based on the first sub-partition; and
a filtering unit 1730 configured to perform filtering on a reconstructed picture of the current picture, wherein the filtering unit 1730 is configured to filter up to one sample in a current sub-partition of reconstructed sub-partitions of the reconstructed block when a height of the current sub-partition is 4 samples or when a width of the current sub-partition is 4 samples, wherein the one sample is positioned in a row or column of the current sub-partition perpendicular to a boundary between the current sub-partition and another sub-partition that is positioned adjacent to the current sub-partition and the one sample is adjacent to the boundary.

Figure 18:
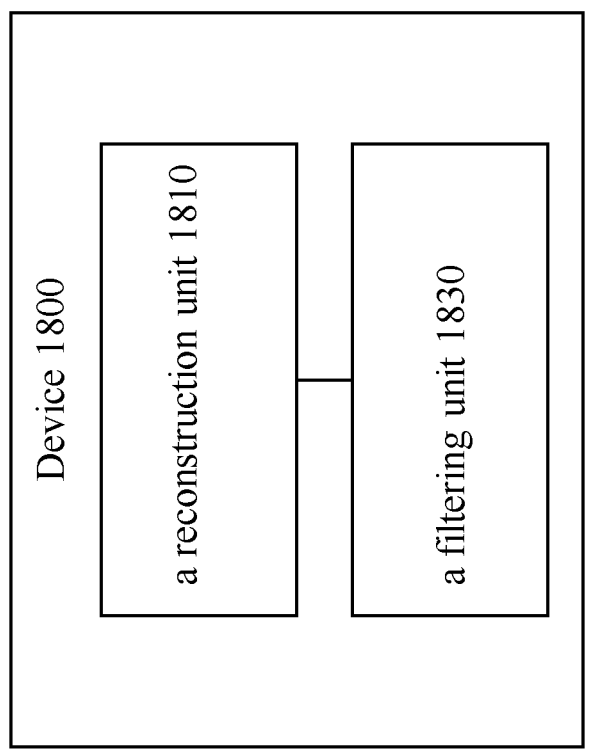
FIG. 18 shows a schematic diagram of a device for video coding.

FIG. 18 is a block diagram illustrating an exemplary device 1800 according to the techniques described in this disclosure (further details will be described below, e.g., based on FIGS. 6-10, and FIG. 16). The device is intended for use in an image encoder and/or an image decoder. In an example, the device 1800 may be corresponding to the encoder in FIG. 2. In another example, the device 1800 may be corresponding to the decoder in FIG. 3. The device may include:
a reconstruction unit 1810 configured to generate a reconstructed block of a current coding block which belongs to a current picture, wherein the current coding block is coded in intra prediction mode and the current coding block is partitioned into sub-partitions comprising a first sub-partition and a second sub-partition, wherein the second sub-partition is intra predicted based on the first sub-partition; and
a filtering unit 1830 configured to perform filtering on a reconstructed picture of the current picture, wherein the filtering unit 1830 is configured to filter a boundary between a current sub-partition of the reconstructed block and a neighboring block which is adjacent to the current sub-partition, based on a maximum filter length of the current sub-partition and a maximum filter length of the neighboring block, and the respective maximum filter lengths of the current sub-partition and the neighboring block being 1 when a height of the current sub-partition is 4 samples or when a width of the current sub-partition is 4 samples.

Based on the above, the present disclosure allows for modifying a small number of sample values at the sub-partition boundary, and therefore the method can reduce the blocking artifact that might be caused by sub-partition boundaries in a block applied with ISP while avoiding filtering overlaps between a block edge and a sub-partition boundary to a certain extent, thus it improves the coding efficiency.

Following is an explanation of the applications of the encoding method as well as the decoding method as shown in the above-mentioned embodiments, and a system using them.

Figure 19:
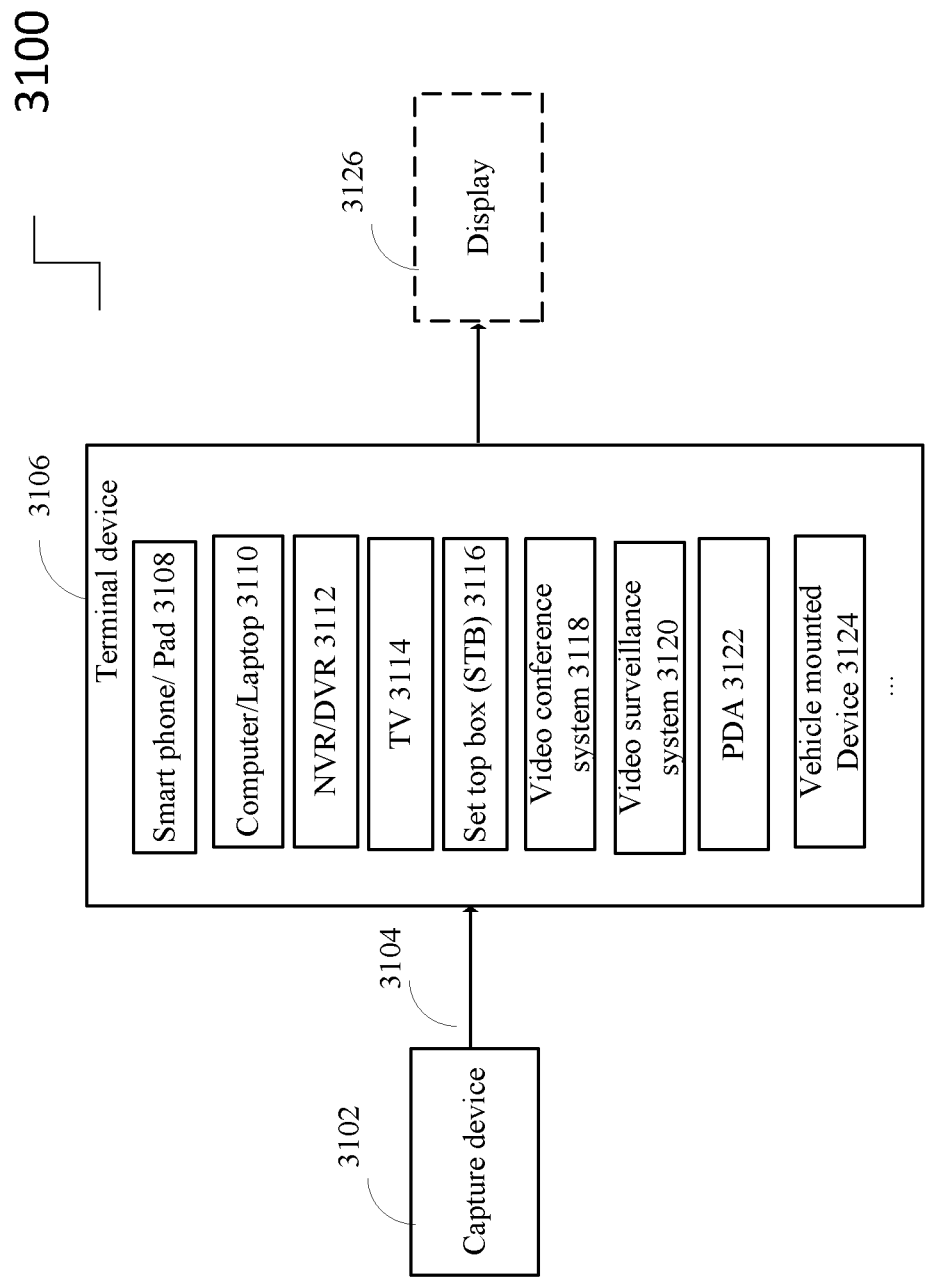
FIG. 19 is a block diagram showing an example structure of a content supply system which realizes a content delivery service.

FIG. 19 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 20:
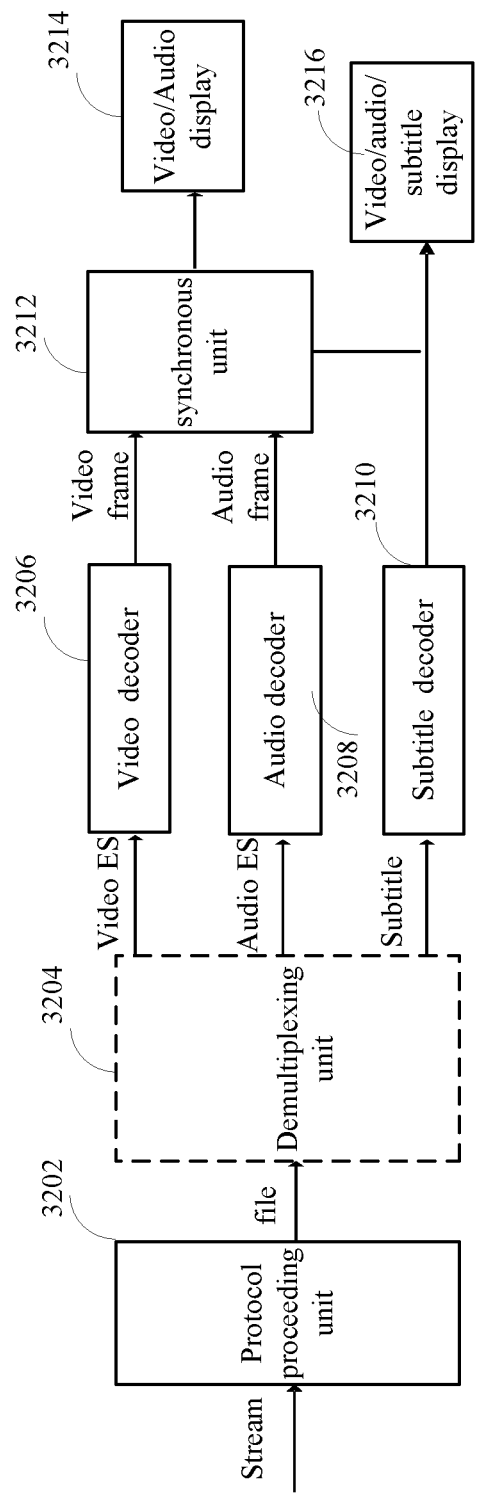
FIG. 20 is a block diagram showing a structure of an example of a terminal device.

FIG. 20 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. Y) before feeding it to the synchronous unit 3212. Similarly, the audio frame may store in a buffer (not shown in FIG. Y) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present invention is not limited to the above-mentioned system, and either the picture encoding device or the picture decoding device in the above-mentioned embodiments can be incorporated into other system, for example, a car system.

The invention has been described in conjunction with various embodiments herein. However, other variations to the disclosed embodiments can be understood and effected by those skilled in the art in practicing the claimed invention, from a study of the drawings, the disclosure and the appended claims. In the claims, the word "comprising" does not exclude other elements or steps and the indefinite article "a" or "an" does not exclude a plurality. A single processor or other unit may fulfill the functions of several items recited in the claims. The mere fact that certain measures are recited in usually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the internet or other wired or wireless communication systems.

The person skilled in the art will understand that the "blocks" ("units") of the various figures (method and apparatus) represent or describe functionalities of embodiments of the invention (rather than necessarily individual "units" in hardware or software) and thus describe equally functions or features of apparatus embodiments as well as method embodiments (unit=step).

The terminology of "units" is merely used for illustrative purposes of the functionality of embodiments of the encoder/decoder and are not intended to limiting the disclosure.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

Embodiments of the invention may further comprise an apparatus, e.g. encoder and/or decoder, which comprises a processing circuitry configured to perform any of the methods and/or processes described herein.

Although embodiments of the invention have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A device, comprising:
   one or more processors; and
   a non-transitory computer-readable storage medium coupled to the one or more processors and storing programming instructions, wherein the one or more processors are configured to execute the programming instructions to cause the device to carry out operations for deblocking a sub-partitions boundary within a coding block during an image encoding or image decoding process, wherein the coding block is coded in an intra prediction mode and the coding block is partitioned into sub-partitions by an intra sub-partition (ISP) and the sub-partitions including a first sub-partition and a second sub-partition, wherein the first sub-partition is vertically adjacent to a second sub-partition,
   and wherein the operations include:
   determining a first maximum filter length to be 1 for the first sub-partition, when a height of the first sub-partition is 4 samples or a height of the second sub-partition is 4 samples; and
   modifying, based at least in part upon the first maximum filter length, a value of up to one sample of the first sub-partition, wherein the up to one sample is obtained from a column of the first sub-partition that is perpendicular to the sub-partitions boundary between the first sub-partition and the second sub-partition and the up to one sample is adjacent to the sub-partitions boundary between the first sub-partition and the second sub-partition,
   wherein the sub-partitions boundary between the first sub-partition and the second sub-partition is caused by the intra sub-partition, and the sub-partitions boundary between the first sub-partition and the second sub-partition is an internal boundary.

2. The device according to claim 1, wherein an intra sub-partitions split type of partitioning the coding block into sub-partitions is horizontal, and the sub-partitions boundary between the first and second sub-partitions is a horizontal sub-partitions boundary.

3. The device according to claim 1, wherein
the intra sub-partitions split type of partitioning the coding block into sub-partitions is horizontal, and the first sub-partition is located above the second sub-partition, and wherein the second sub-partition is intra predicted based on a reconstructed value of the first sub-partition.

4. The device according to claim 1, wherein a number of sub-partitions in the coding block is 2 or 4.

5. The device according to claim 1, wherein
when a width of the coding block is equal to 4 and a height of the coding block is equal to 8 or when the width of the coding block is equal to 8 and the height of the coding block is equal to 4, a number of sub-partitions in the coding block is 2,
otherwise, the number of sub-partitions is 4.

6. The device according to claim 1, wherein the up to one sample in the first sub-partition is modified, only when the sub-partitions boundary between the first and second sub-partitions overlaps with a 4×4 sample grid.

7. The device according to claim 1, wherein samples of the sub-partitions are luma samples.

8. The device according to claim 1, wherein the sub-partitions are rectangular transform block sub-partitions.

9. The device according to claim 1,
wherein the order of intra predicting the sub-partitions is from top to bottom, and the intra sub-partitions split type of partitioning the coding block into sub-partitions is horizontal.

10. A method for deblocking a sub-partitions boundary within a coding block during an image encoding or image decoding process and implemented by a coding device, wherein the coding block is coded in an intra prediction mode and the coding block is partitioned into sub-partitions by an intra sub-partition (ISP) and the sub-partitions including a first sub-partition and a second sub-partition, and wherein the first sub-partition is vertically adjacent to the second sub-partition, the method comprising:
determining a first maximum filter length to be 1 for the first sub-partition, when a height of the first sub-partition is 4 samples or a height of the second sub-partition is 4 samples; and
modifying, based at least in part upon the first maximum filter length, a value of up to one sample of the first sub-partition, wherein the up to one sample is obtained from a column of the first sub-partition that is perpendicular to the sub-partitions boundary between the first sub-partition and the second sub-partition and the up to one sample is adjacent to the sub-partitions boundary between the first sub-partition and the second sub-partition,
wherein the sub-partitions boundary between the first sub-partition and the second sub-partition is caused by the intra sub-partition, and the sub-partitions boundary between the first sub-partition and the second sub-partition is an internal boundary.

11. The method according to claim 10, wherein an intra sub-partitions split type of partitioning the coding block into sub-partitions is horizontal, and the sub-partitions boundary between the first and second sub-partitions is a horizontal sub-partitions boundary.

12. The method according to claim 10, wherein
the intra sub-partitions split type of partitioning the coding block into sub-partitions is horizontal, and the first sub-partition is located above the second sub-partition, and wherein the second sub-partition is intra predicted based on a reconstructed value of the first sub-partition.

13. The method according to claim 10, wherein a number of sub-partitions in the coding block is 2 or 4.

14. The method according to claim 10, wherein
when a width of the coding block is equal to 4 and a height of the coding block is equal to 8 or when the width of the coding block is equal to 8 and the height of the coding block is equal to 4, a number of sub-partitions in the coding block is 2,
otherwise, the number of sub-partitions is 4.

15. The method according to claim 10, wherein the up to one sample in the first sub-partition is modified, only when the sub-partitions boundary between the first and second sub-partitions overlaps with a 4×4 sample grid.

16. The method according to claim 10, wherein samples of the sub-partitions are luma samples.

17. The method according to claim 10, wherein the sub-partitions are rectangular transform block sub-partitions.

18. The method according to claim 10,
wherein the order of intra predicting the sub-partitions is from top to bottom, and the intra sub-partitions split type of partitioning the coding block into sub-partitions is horizontal.

19. A non-transitory computer-readable medium carrying programming instructions which, when executed by a computing device, cause the computing device to perform operations for deblocking a sub-partitions boundary within a coding block in image encoding or image decoding process, wherein the coding block is coded in an intra prediction mode and the coding block is partitioned into sub-partitions by an intra sub-partition (ISP) and the sub-partitions including a first sub-partition and a second sub-partition, wherein the first sub-partition is vertically adjacent to the second sub-partition, and wherein the operations include:
determining a first maximum filter length to be 1 for the first sub-partition, when a height of the first sub-partition is 4 samples or a height of the second sub-partition is 4 samples; and
modifying, based on the first maximum filter length, a value of up to one sample of the first sub-partition, wherein the value of the up to one sample is obtained from a column of the first sub-partition that is perpendicular to the sub-partitions boundary between the first sub-partition and the second sub-partition and the up to one sample is adjacent to the sub-partitions boundary between the first sub-partition and the second sub-partition,
wherein the sub-partitions boundary between the first sub-partition and the second sub-partition is caused by the intra sub-partition, and the sub-partitions boundary between the first sub-partition and the second sub-partition is an internal boundary.

20. The non-transitory computer-readable medium according to claim 19,
wherein the up to one sample in the first sub-partition is modified, only when the sub-partitions boundary between the first and second sub-partitions overlaps with a 4×4 sample grid.

21. The non-transitory computer-readable medium according to claim 19,
wherein the order of intra predicting the sub-partitions is from top to bottom, and the intra sub-partitions split type of partitioning the coding block into sub-partitions is horizontal.

* * * * *